United States Patent
Shigemori et al.

(10) Patent No.: US 12,024,054 B2
(45) Date of Patent: Jul. 2, 2024

(54) BATTERY MANAGEMENT SYSTEM

(71) Applicant: DENSO CORPORATION, Kariya (JP)

(72) Inventors: Shogo Shigemori, Kariya (JP); Takeshi Iida, Kariya (JP); Tatsuhiro Numata, Kariya (JP)

(73) Assignee: DENSO CORPORATION, Kariya (JP)

( * ) Notice: Subject to any disclaimer, the term of this patent is extended or adjusted under 35 U.S.C. 154(b) by 290 days.

(21) Appl. No.: 17/699,419

(22) Filed: Mar. 21, 2022

(65) Prior Publication Data

US 2022/0305951 A1    Sep. 29, 2022

(30) Foreign Application Priority Data

Mar. 24, 2021   (JP) .................. 2021-050375
Nov. 9, 2021   (JP) .................. 2021-182753

(51) Int. Cl.
*B60L 58/12* (2019.01)
*H02J 7/00* (2006.01)

(52) U.S. Cl.
CPC .......... *B60L 58/12* (2019.02); *H02J 7/00032* (2020.01); *H02J 7/0048* (2020.01)

(58) Field of Classification Search
CPC ................. B60W 40/09; B60W 20/20; B60W 2554/4041; B60W 2040/0809
See application file for complete search history.

(56) References Cited

U.S. PATENT DOCUMENTS

| | | | |
|---|---|---|---|
| 9,475,402 B2 * | 10/2016 | Won .................. | G01C 21/3469 |
| 2015/0134167 A1 * | 5/2015 | Won ................... | B60L 55/00 |
| | | | 701/29.3 |
| 2015/0268308 A1 * | 9/2015 | Nakayama .......... | B60L 58/16 |
| | | | 702/50 |

FOREIGN PATENT DOCUMENTS

| | | |
|---|---|---|
| JP | 2012-120347 A | 6/2012 |
| JP | 2016-012954 A | 1/2016 |
| JP | 6514694 B2 | 5/2019 |
| JP | 2020-085487 A | 6/2020 |
| WO | 2015/189898 A1 | 12/2015 |

* cited by examiner

*Primary Examiner* — Ramsey Refai
(74) *Attorney, Agent, or Firm* — Posz Law Group, PLC

(57) ABSTRACT

A battery management system in a vehicle includes: monitoring devices arranged in a housing accommodating battery; and a control device arranged in the housing, acquiring battery information from the monitoring devices, and performing a predetermined process. The control device stores, in advance as learning data, data that correlates with an electric field intensity in the housing for frequency channels that are usable to transmit and receive data to and from each of the monitoring devices performing wireless communication. The control device determines a target frequency channel of the frequency channel hopping based on the learning data.

8 Claims, 15 Drawing Sheets

FIG. 9
| 1 | 2 | 3 | 4 | 5 | 6 | 7 | 8 | 9 | 10 | 1 | 2 | ... |
|---|---|---|---|---|---|---|---|---|---|---|---|---|
| ch1 | ch4 | ch7 | ch10 | ch3 | ch6 | ch9 | ch2 | ch5 | ch8 | ch1 | ch4 | ... |
FIG. 10
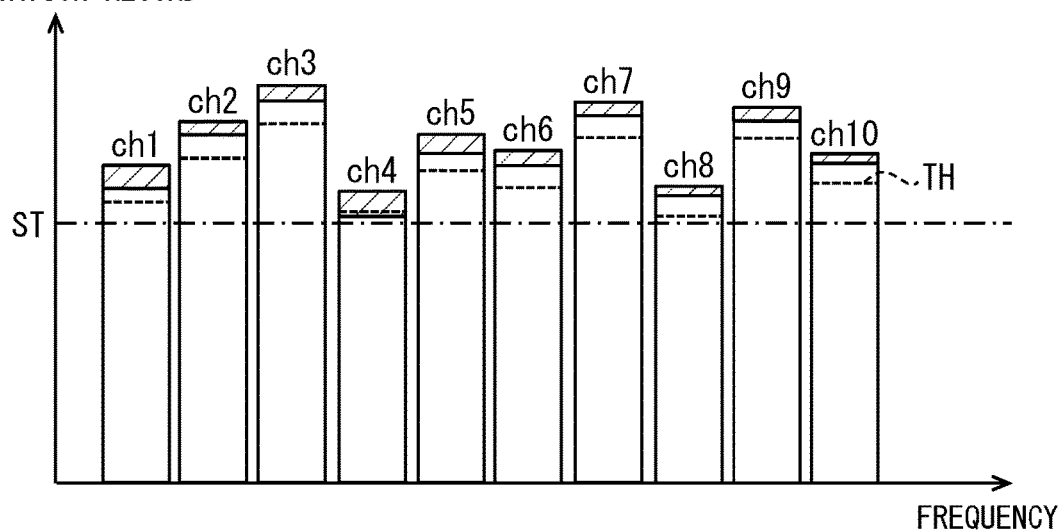
FIG. 11
| 1 | 2 | 3 | 4 | 5 | 6 | 7 | 8 | 9 | 10 |
|---|---|---|---|---|---|---|---|---|---|
| ch1 | ch4 | ch7 | ch10 | ch3 | ch6 | ch9 | ch2 | ch5 | ch8 |
NG
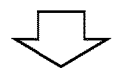
| 1 | 2 | 3 | 4 | 5 | 6 | 7 | 8 | 9 |
|---|---|---|---|---|---|---|---|---|
| ch1 | ch7 | ch10 | ch3 | ch6 | ch9 | ch2 | ch5 | ch8 |

BATTERY MANAGEMENT SYSTEM

CROSS REFERENCE TO RELATED APPLICATION

The present application is based on and claims the benefit of priority of Japanese Patent Application No. 2021-050375, filed on Mar. 24, 2021, and No. 2021-182753, filed on Nov. 9, 2021, the disclosure of which are incorporated herein by reference.

TECHNICAL FIELD

The present disclosure generally relates to a battery management system.

BACKGROUND INFORMATION

A comparative example (Japanese Patent No. 6514694) discloses a battery management system, and is incorporated herein by reference as an explanation of the technical elements in the present disclosure.

SUMMARY

It is an object of the present disclosure to provide a battery management system capable of providing highly reliable wireless communication.

The disclosed aspects in the specification adopt different technical solutions from each other in order to achieve their respective objects. The objects, features, and advantages disclosed in the specification will become apparent by referring to following detailed descriptions and accompanying drawings.

BRIEF DESCRIPTION OF THE DRAWINGS

Objects, features, and advantages of the present disclosure will become more apparent from the following detailed description made with reference to the accompanying drawings, in which:

FIG. 9 is a diagram showing a hopping pattern as an example of frequency channel hopping;

FIG. 10 is a diagram showing an example of a threshold value set based on communication record of each of the frequency channels and learning data;

FIG. 11 is a diagram showing a hopping pattern in consideration of unusability;

DETAILED DESCRIPTION

Figure 1:
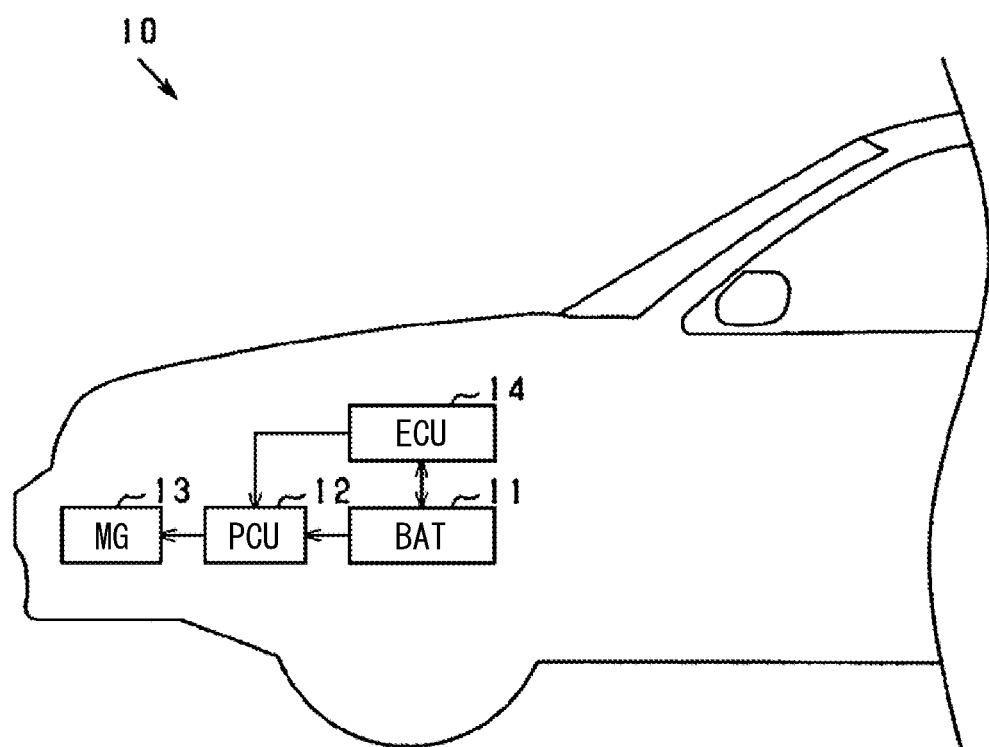
FIG. 1 is a diagram showing a vehicle equipped with a battery pack.

Hereinafter, multiple embodiments are described with reference to the drawings. The same reference numerals are assigned to the corresponding elements in each embodiment, and thus, duplicate descriptions may be omitted. In each of the embodiments, when only a part of the configuration is described, the remaining parts of the configuration may adopt corresponding parts of other embodiments. Further, not only the combinations of the configurations explicitly shown in the description of the respective embodiments, but also the configurations of the plurality of embodiments can be partially combined even when they are not explicitly shown as long as there is no difficulty in such combination in particular.

First Embodiment

First, based on FIG. 1, a vehicle equipped with a battery management system according to the present embodiment, particularly, a configuration regarding a battery pack provided with the battery management system is described. FIG. 1 is a diagram showing a schematic configuration of a vehicle. The vehicle is an electric-powered vehicle such as an electric vehicle, a hybrid vehicle or the like.

<Vehicle>

As shown in FIG. 1, a vehicle 10 includes a battery pack (BAT) 11, a PCU 12, an MG 13, and an ECU 14. PCU is an abbreviation for Power Control Unit. MG is an abbreviation for Motor Generator. "ECU" is an abbreviation for "Electronic Control Unit."

The battery pack 11 includes an assembled battery 20, which is described later, and provides a DC voltage source that can be charged and discharged. The battery pack 11 supplies electric power to an electric load of the vehicle 10. The battery pack 11 supplies power to the MG 13 through the PCU 12. The battery pack 11 is charged through the PCU 12. The battery pack 11 may sometimes be referred to as a main battery.

The battery pack 11 is located in a front compartment of the vehicle 10, for example, as shown in FIG. 1. The battery pack 11 may also be located in a rear compartment, under a seat, under a floor, and the like. For example, in case of a hybrid vehicle, a compartment in which the engine is located may sometimes be referred to as an engine compartment or an engine room.

The PCU 12 performs bi-directional power conversion between the battery pack 11 and the MG 13 according to a control signal from the ECU 14. The PCU 12 may sometimes be referred to as a power converter. The PCU 12 includes, for example, an inverter. The inverter converts a DC voltage into an AC voltage, for example, into a three-phase AC voltage, and outputs the AC voltage to the MG 13. The inverter converts the generated electric power of the MG 13 into a DC voltage and outputs it to the converter. The PCU 12 may include a converter. The converter is arranged in an energization path between the battery pack 11 and the inverter. The converter has a function of raising and lowering the DC voltage.

The MG 13 is an AC rotating electric machine, for example, a three-phase AC synchronous motor in which a permanent magnet is embedded in a rotor. The MG 13 functions as a traveling power source for the vehicle 10, that is, an electric motor. The MG 13 is driven by the PCU 12 to generate a rotational driving force. The driving force generated by the MG 13 is transmitted to driving wheels. The MG 13 functions as a generator when the vehicle 10 is braked, and performs regenerative power generation. The generated power of the MG 13 is supplied to the battery pack 11 through the PCU 12 and stored in the assembled battery 20 in the battery pack 11.

The ECU 14 is configured to include a computer including a processor, a memory, an input/output interface, a bus connecting them, and the like. The processor is hardware for arithmetic process. The processor includes, for example, a CPU as a core. CPU is an abbreviation for Central Process Unit. A memory is a non-transitory, substantive storage medium that non-temporarily stores or memorizes programs and data that can be read by a computer. The memory stores various programs executed by the processor.

The ECU 14 acquires information about the assembled battery 20 from the battery pack 11, for example, and controls the PCU 12 to control the drive of the MG 13 and the charging/discharging of the battery pack 11. The ECU 14 may acquire information such as voltage, temperature, electric current, SOC (State of Charge), and SOH (State of Health) of the assembled battery 20 from the battery pack 11. The ECU 14 may acquire battery information such as voltage, temperature, and electric current of the assembled battery 20 to calculate SOC and SOH. SOC is an abbreviation for State Of Charge. SOH is an abbreviation for State Of Health.

The processor of the ECU 14 performs a plurality of instructions included in, for example, a PCU control program stored in a memory. As a result, the ECU 14 constructs a plurality of functional units for controlling the PCU 12. In the ECU 14, a plurality of functional units are constructed/provided by causing a processor to execute a plurality of instructions under control of a program stored in a memory. The ECU 14 may be referred to as an EV ECU.

<Battery Pack>

Figure 2:
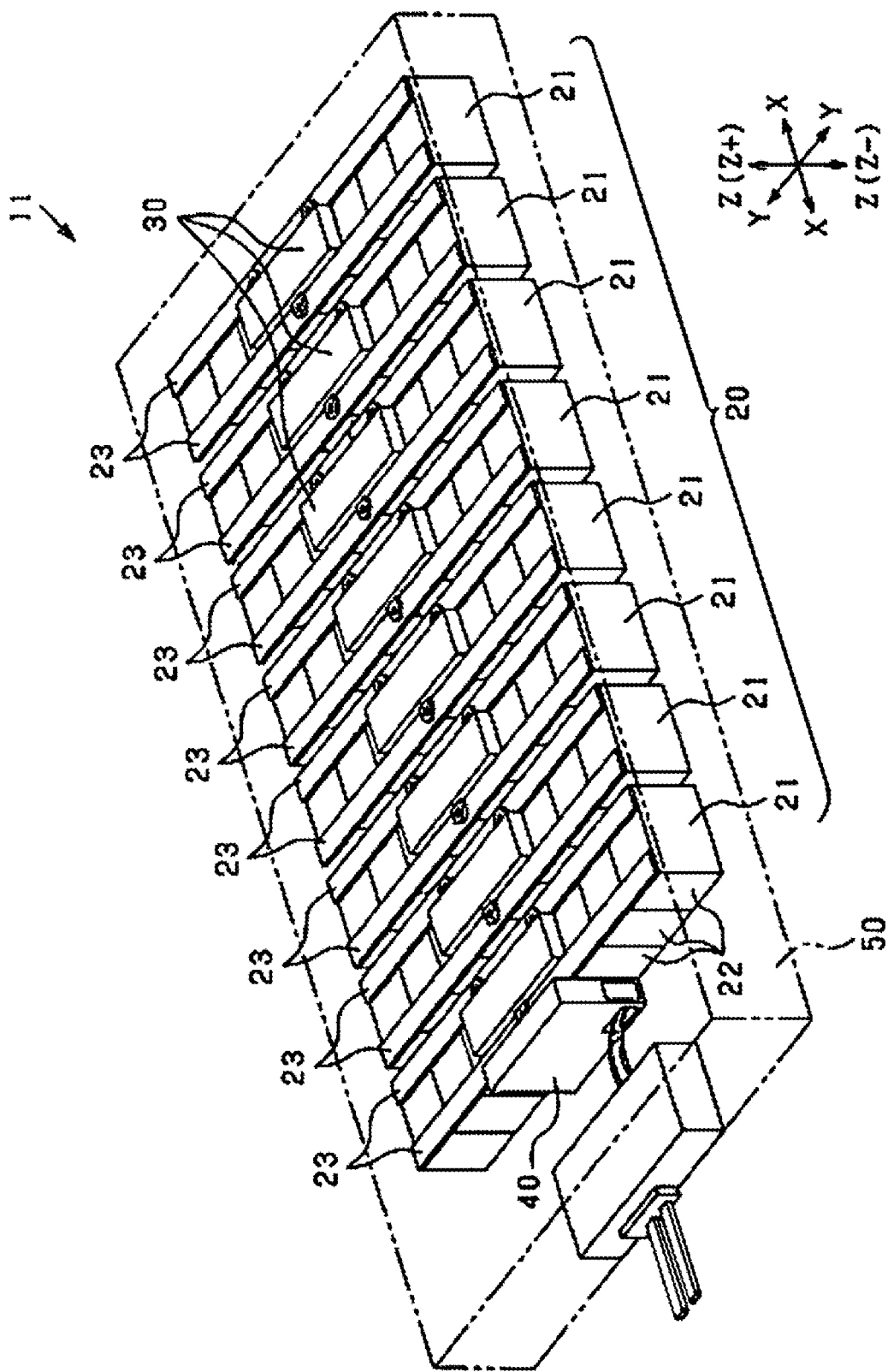
FIG. 2 is a perspective view showing a schematic configuration of a battery pack.
Figure 3:
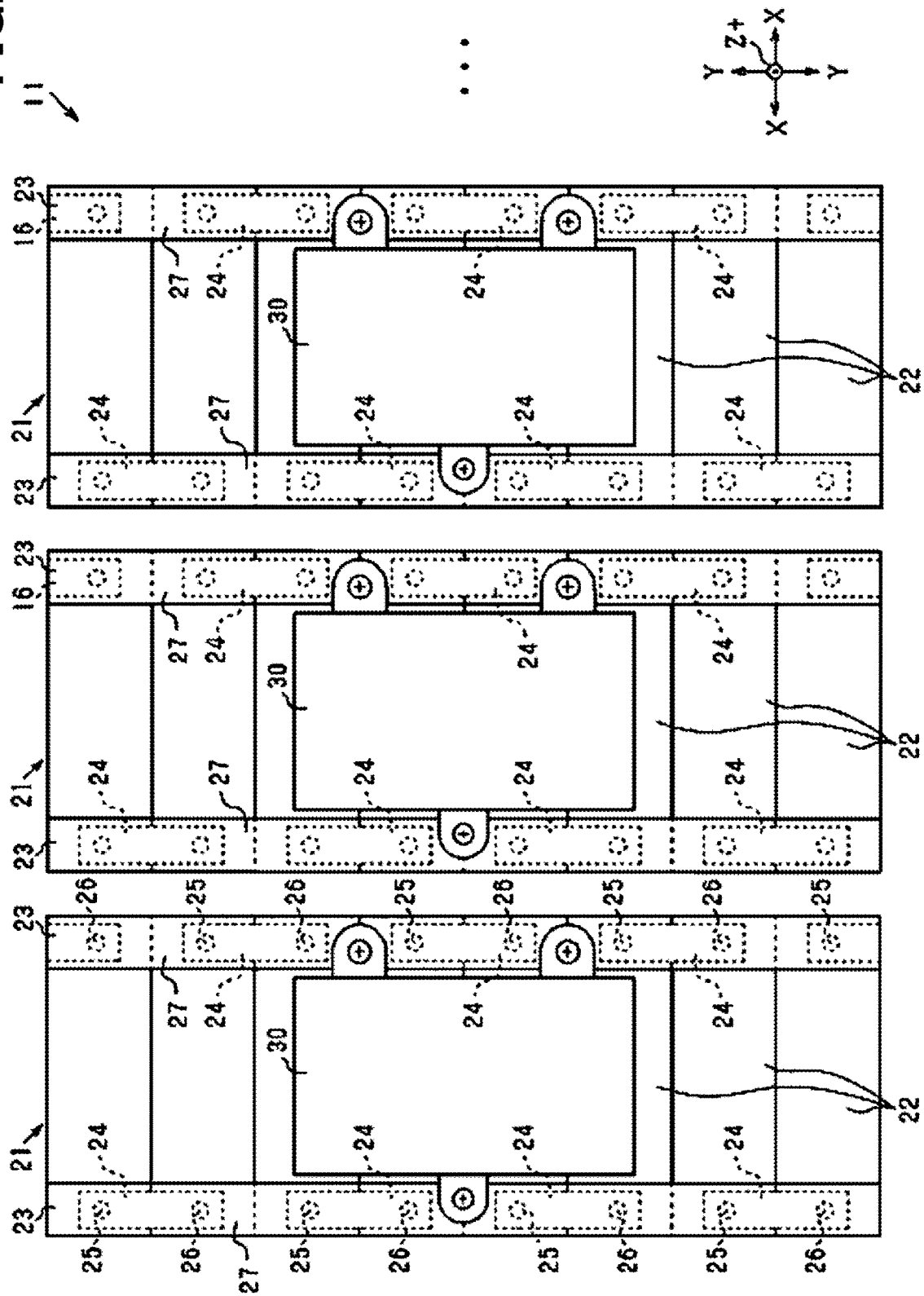
FIG. 3 is a plan view showing an assembled battery.

Next, an example of a configuration of the battery pack 11 is described with reference to FIGS. 2 and 3. FIG. 2 is a perspective view schematically showing an inside of the battery pack 11. In FIG. 2, the housing is indicated by a two-dot chain line. FIG. 3 is a plan view showing an upper surface of each battery stack.

As shown in FIG. 2, the battery pack 11 includes an assembled battery 20, a plurality of monitoring devices 30, a control device 40, and a housing 50. The housing 50 houses other elements constituting the battery pack 11, that is, the assembled battery 20, the monitoring device 30, and the control device 40. The housing 50 is made of metal, for example. The housing 50 may be made of resin, or may include a metal portion and a resin portion.

In the following, as shown in FIG. 2, among the surfaces/faces of the housing 50 which has a substantially rectangular parallelepiped shape, a mounting surface on the vehicle 10 has a longer side aligned in the X direction and a shorter side aligned in the Y direction. In FIG. 2, the lower surface is the mounting surface. The vertical direction perpendicular to the mounting surface is referred to as the Z direction. The X direction, the Y direction, and the Z direction are in a positional relationship orthogonal to each other. In the present embodiment, the left-right direction of the vehicle 10 corresponds to the X direction, the front-rear direction corresponds to the Y direction, and the vertical direction corresponds to the Z direction. The arrangement of FIGS. 2 and 3 is only an example, and the battery pack 11 may be arranged in any direction with respect to the vehicle 10.

The assembled battery 20 has a plurality of battery stacks 21 arranged side by side in the X direction. The battery stack 21 may also be referred to as a battery block or a battery module. The assembled battery 20 is configured by connecting a plurality of battery stacks 21 in series. Each battery stack 21 has a plurality of battery cells 22. The battery stack 21 has a plurality of battery cells 22 connected in series. The battery stack 21 of the present embodiment is configured by connecting a plurality of battery cells 22 arranged side by side in the Y direction in series. The assembled battery 20 provides the above-mentioned DC voltage source. The assembled battery 20, the battery stack 21, and the battery cell 22 correspond to a battery.

The battery cell 22 is a secondary battery that generates an electromotive voltage by a chemical reaction. As the secondary battery, for example, a lithium ion secondary battery or a nickel hydrogen secondary battery can be adopted. A lithium ion secondary battery is a secondary battery using lithium as a charge carrier. In addition to a general lithium ion secondary battery in which the electrolyte is liquid, a so-called all-solid-state battery using a solid electrolyte can also be included.

On an upper surface of each battery stack 21, linear bus bar units 23 are arranged at both ends in the X direction. That is, a pair of bus bar units 23 are arranged in each battery stack 21. The bus bar unit 23 electrically connects a plurality of battery cells 22. As shown in FIG. 3, each battery cell 22 is formed in a flat shape, and is laminated/layered so that side surfaces overlap (are stacked) each other in the Y direction. The battery cell 22 has positive electrode terminals 25 and negative electrode terminals 26 that project in the Z direction indicating upward direction, at both ends in the X direction. The battery cells 22 are laminated so that the positive electrode terminals 25 and the negative electrode terminals 26 are alternately arranged in the Y direction.

Each of the bus bar units 23 has a plurality of bus bars 24 that electrically connect the positive electrode terminal 25 and the negative electrode terminal 26, and a bus bar cover 27 that covers the plurality of bus bars 24. The bus bar 24 is a plate member made of a metal having good conductivity such as copper. The bus bar 24 electrically connects the positive electrode terminal 25 and the negative electrode terminal 26 of the adjacent battery cells 22 in the Y direction. As a result, in each battery stack 21, a plurality of battery cells 22 are electrically connected in series. In each battery stack 21, the positive electrode terminal 25 of the battery cell 22 arranged on one end side in the Y direction is connected to a predetermined positive electrode wiring, and the negative electrode terminal 26 of the battery cell 22 arranged on the other end side is connected to a predetermined negative electrode wiring.

The bus bar cover 27 is formed by using an electrically insulating material such as resin. The bus bar cover 27 is provided linearly from one end to the other of the battery stack 21 along the Y direction to cover the plurality of bus bars 24.

The monitoring device 30 is provided for each of the plurality of battery stacks 21. As shown in FIG. 2, the monitoring device 30 is arranged between a pair of bus bar units 23 in each battery stack 21. The monitoring device 30 is fixed to the bus bar unit 23 with screws or the like. The monitoring device 30 has a circuit board (not shown), and is fixed so that a thickness direction of the circuit board substantially coincides with the Z direction. As is described later, the monitoring device 30 is configured to enable wireless communication with the control device 40. An antenna 37, which is described later, included in the monitoring device 30 is arranged so as not to overlap the bus bar unit 23 in the Z direction, that is, to protrude from the bus bar unit 23 in the Z direction.

The control device 40 is attached to an outer side surface of the battery stack 21 arranged at one end in the X direction. The control device 40 is configured to enable wireless communication with each of the monitoring devices 30. The antenna 42, which is described later, included in the control device 40 is arranged at the same height as the antenna 37 of the monitoring device 30 in the Z direction. That is, the antenna 42 of the control device 40 is provided so as to protrude from the bus bar unit 23 in the Z direction.

In the battery pack 11, the monitoring device 30 and the control device 40 provide a battery management system 60, which is described later. That is, the battery pack 11 includes a battery management system 60.

<Battery Management System>

Figure 4:
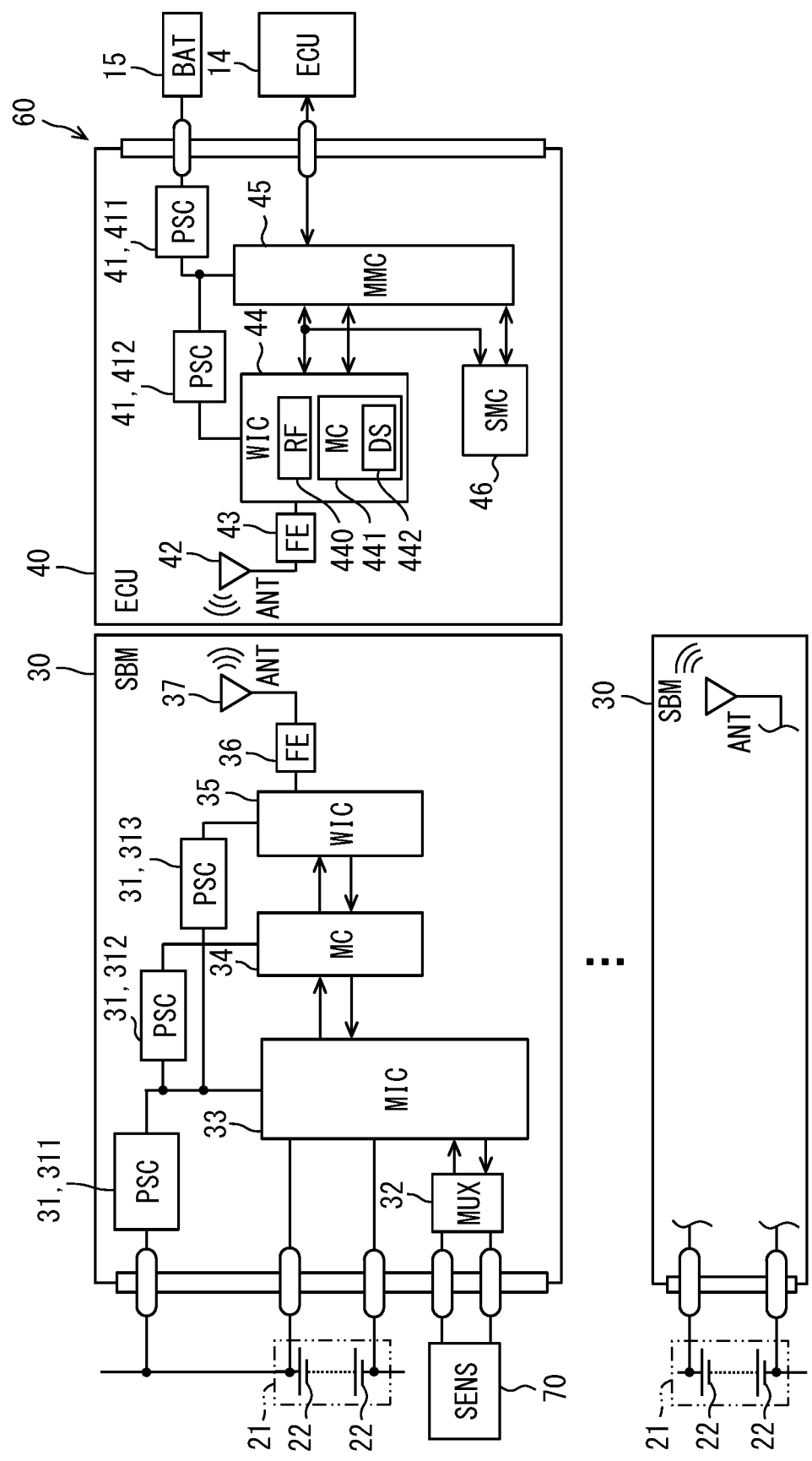
FIG. 4 is a block diagram showing a configuration of a battery management system according to a first embodiment.

Next, a schematic configuration of the battery management system is described with reference to FIG. 4. FIG. 4 is a block diagram showing a configuration of the battery management system.

As shown in FIG. 4, the battery management system 60 includes a plurality of management devices (SBM) 30 and a control device (ECU) 40. The control device 40 may be referred to as a battery ECU or BMU. BMU is an abbreviation for Battery Management Unit. The battery management system 60 is a system that manages batteries by using wireless communication. In the battery management system 60, wireless communication is performed between one control device 40 and a plurality of monitoring devices 30. The wireless communication in the present embodiment uses a frequency band in short-range (near-field) communication, for example, a 2.4 GHz band or a 5 GHz band.

<Monitoring Device>

First, the monitoring device 30 is described. Since the configurations of the monitoring devices 30 are almost the same among all devices 30, the common configurations are described below. The monitoring device 30 includes a power supply circuit (PSC) 31, a multiplexer (MUX) 32, a monitoring IC (MIC) 33, a microcomputer (MC) 34, a wireless IC (WIC) 35, and a front-end circuit (FE) 36, and an antenna (ANT) 37. Communication between those elements in the monitoring device 30 is performed by wire.

The power supply circuit 31 uses the voltage supplied from the battery stack 21 to generate an operating power for operating other circuit elements included in the monitoring device 30. In the present embodiment, the power supply circuit 31 includes power supply circuits 311, 312, 313. The power supply circuit 311 generates a predetermined voltage using the voltage supplied from the battery stack 21 and supplies it to the monitoring IC 33. The power supply circuit 312 generates a predetermined voltage using the voltage generated by the power supply circuit 311 and supplies it to a microcomputer 34. The power supply circuit 313 generates a predetermined voltage using the voltage generated by the power supply circuit 311 and supplies it to the wireless IC 35.

The multiplexer 32 is a selection circuit that inputs detection signals of a plurality of sensors 70 included in the battery pack 11 and outputs them as one signal. The multiplexer 32 selects (i.e., switches) an input according to the selection signal from the monitoring IC 33 and outputs it as one signal. The sensor 70 includes a sensor that detects a physical quantity of each of the battery cells 22, a sensor for determining/identifying which of many battery cells 22 is currently involved, and the like. Physical quantity detection sensors include, for example, voltage sensors, temperature sensors, current sensors, and the like.

The monitoring IC 33 senses (i.e., acquires) battery information such as cell voltage, cell temperature, and cell determination through the multiplexer 32, and transmits the battery information to the microcomputer 34. The monitoring IC 33 may sometimes be referred to as a cell monitoring circuit (CSC). CSC is an abbreviation for Cell Supervising Circuit. The monitoring IC 33 may have a function of (i) performing a failure diagnosis of a circuit portion of the monitoring device 30 including the IC 33 and (ii) transmitting a diagnosis result together with battery information as monitoring data. When the monitoring IC 33 receives data requesting to acquire the battery information transmitted from the microcomputer 34, the monitoring IC 33 senses (i.e., picks up) the battery information through the multiplexer 32, and transmits the monitoring data including at least the battery information to the microcomputer 34. The monitoring IC 33 corresponds to a monitoring unit.

The microcomputer 34 is a microcomputer provided with a CPU as a processor, ROMs and RAMs as memories, input/output interfaces, and a bus for connecting them. The CPU constructs a plurality of functional units by executing various programs stored in the ROM while using the temporary storage function of the RAM. ROM is an abbreviation for Read Only Memory. RAM is abbreviation for Random Access Memory.

The microcomputer 34 controls the schedule of sensing and self-diagnosis by the monitoring IC 33. The microcomputer 34 receives the monitoring data transmitted from the monitoring IC 33 and transmits it to the wireless IC 35. The microcomputer 34 transmits data requesting acquisition of the battery information to the monitoring IC 33. As an example, when the microcomputer 34 of the present embodiment receives the data requesting the acquisition of the battery information transmitted from the wireless IC 35, the microcomputer 34 transmits the data requesting the acquisition of the battery information to the monitoring IC 33.

The wireless IC 35 includes an RF circuit and a microcomputer (not illustrated) for transmitting and receiving data wirelessly. The wireless IC 35 has a transmission function of modulating the transmission data and oscillating at the frequency of the RF signal. The wireless IC 35 has a reception function for demodulating received data. RF is an abbreviation for Radio Frequency.

The wireless IC 35 modulates the data including the battery information transmitted from the microcomputer 34 and transmits it to the control device 40 via the front-end circuit 36 and the antenna 37. The wireless IC 35 adds data necessary for wireless communication such as communication control information to transmission data including the battery information, and transmits the data. The data required for wireless communication includes, for example, an identifier (ID) and an error detection code. The wireless IC 35 controls the data size, communication format, schedule, error detection, etc. of the communication between the SBM 30 and the control device 40.

The wireless IC 35 receives the data transmitted from the control device 40 via the antenna 37 and the front-end circuit 36, and demodulates the data. When the wireless IC 35 receives, for example, data including a battery information acquisition and transmission request, the wireless IC 35 acquires the monitoring data including the battery information through the monitoring IC 33 and transmits the monitoring data to the control device 40 as a response to the request. The wireless IC 35 corresponds to a wireless circuit unit. The wireless IC 35 corresponds to a wireless circuit portion/unit.

The front-end circuit 36 has a matching circuit for impedance matching between the wireless IC 35 and the antenna 37, and a filter circuit for removing unnecessary frequency components.

The antenna 37 converts an RF signal, which is an electric signal, into a radio wave and radiates it into space. The antenna 37 receives radio waves propagating in space and converts them into electric signals.

<Control Device>

Next, the control device 40 is described with reference to FIG. 4. The control device 40 includes a power supply circuit (PSC) 41, an antenna (ANT) 42, a front-end circuit (FE) 43, a wireless IC (WIC) 44, a main microcomputer (MMC) 45, and a sub-microcomputer (SMC) 46. Communication between each of those elements in the control device 40 is performed by wire.

The power supply circuit 41 uses a voltage supplied from a battery (BAT) 15 to generate an operating power for operating other circuit elements included in the control device 40. The battery 15 is a DC voltage source mounted on the vehicle 10 and different from the battery pack 11. The battery 15 may sometimes be referred to as an auxiliary battery because it supplies electric power to auxiliary equipment of the vehicle 10. In the present embodiment, the power supply circuit 41 includes power supply circuits 411 and 412. The power supply circuit 411 generates a predetermined voltage using a voltage supplied from the battery 15, and supplies the voltage to the main microcomputer 45 and the sub-microcomputer 46. For the sake of simplification of the drawing, the electrical connection between the power supply circuit 411 and the sub-microcomputer 46 is omitted. The power supply circuit 412 generates a predetermined voltage using a voltage generated by the power supply circuit 411 and supplies it to the wireless IC 44.

The antenna 42 converts an RF signal, which is an electric signal, into a radio wave and radiates it into space. The antenna 42 receives radio waves propagating in space and converts them into electric signals.

The front-end circuit 43 includes a matching circuit for impedance matching between the wireless IC 44 and the antenna 42, and a filter circuit for removing unnecessary frequency components.

The wireless IC 44 has an RF circuit and a microcomputer for wirelessly transmitting and receiving data. Like the wireless IC 35, the wireless IC 44 has a transmission function and a reception function. The wireless IC 44 receives the data transmitted from the monitoring device 30 via the antenna 42 and the front-end circuit 43, and demodulates the data. Then, the monitoring data including the battery information is transmitted to the main microcomputer 45. The wireless IC 44 receives the data transmitted from the main microcomputer 45, modulates it, and transmits it to the monitoring device 30 via the front-end circuit 43 and the antenna 42. The wireless IC 44 adds data necessary for wireless communication such as communication control information to the transmission data and transmits the data. The data required for wireless communication includes, for example, an identifier (ID) and an error detection code. The wireless IC 44 controls the data size, communication format, schedule, error detection, and the like of communication between the monitoring device 30 and the control device 40.

The wireless IC 44 has a learning data storage unit (DS) 442. The learning data storage unit 442 is constructed in, for example, a non-volatile memory of a microcomputer 441. The learning data storage unit 442 may be constructed in a non-volatile storage medium provided in the control device 40 separately from the memory of the microcomputer 441. The learning data storage unit 442 stores the learning data. Learning data is data that correlates with the electric field intensity in the housing 50 for a usable frequency channel that can be used for transmitting and receiving data to and from the monitoring device 30. The learning data storage unit 442 stores learning data for each of the monitoring devices 30 that wirelessly communicate with the ECU 40. The wireless IC 44 determines a frequency channel used for frequency channel hopping based on the learning data. The learning data and the determination of the frequency channel using the learning data are described later.

The main microcomputer 45 is a microcomputer provided with a CPU, a ROM, a RAM, an input/output interface, a bus connecting them, and the like. The ROM stores various programs executed by the CPU. The main microcomputer 45 generates a command requesting the monitoring device 30 to process the monitoring data including the battery information, and transmits the transmission data including the command to the wireless IC 44. The main microcomputer 45 of the present embodiment generates a command requesting acquisition and transmission of the monitoring data including the battery information. The request herein may also be referred to as instruction.

The main microcomputer 45 receives the monitoring data including the battery information transmitted from the wireless IC 44, and performs a predetermined process based on the monitoring data. For example, the main microcomputer 45 performs a process of transmitting the acquired battery information to the ECU 14. The main microcomputer 45 may calculate the SOC and/or SOH based on the battery information, and may transmit the battery information including the calculated SOC and SOH to the ECU 14. The main microcomputer 45 may perform an equalization process for equalizing the voltage of each of the battery cells 22 based on the battery information. The main microcomputer 45 may acquire an IG signal of the vehicle 10 and perform the above-described process according to a drive state of the vehicle 10. The main microcomputer 45 may perform a process of detecting an abnormality in the battery cell 22 based on the battery information, or may transmit abnormality detection information to the ECU 14.

The sub-microcomputer 46 is a microcomputer provided with a CPU, ROM, RAM, an input/output interface, a bus connecting these, and the like. The ROM stores various programs executed by the CPU. The sub-microcomputer 46 performs a monitoring process for monitoring components/data in the control device 40. For example, the sub-microcomputer 46 may monitor the data exchanged between the wireless IC 44 and the main microcomputer 45. The sub-microcomputer 46 may monitor a state of the main microcomputer 45. The sub-microcomputer 46 may monitor a state of the wireless IC 44.

<Wireless Communication>

Figure 5:
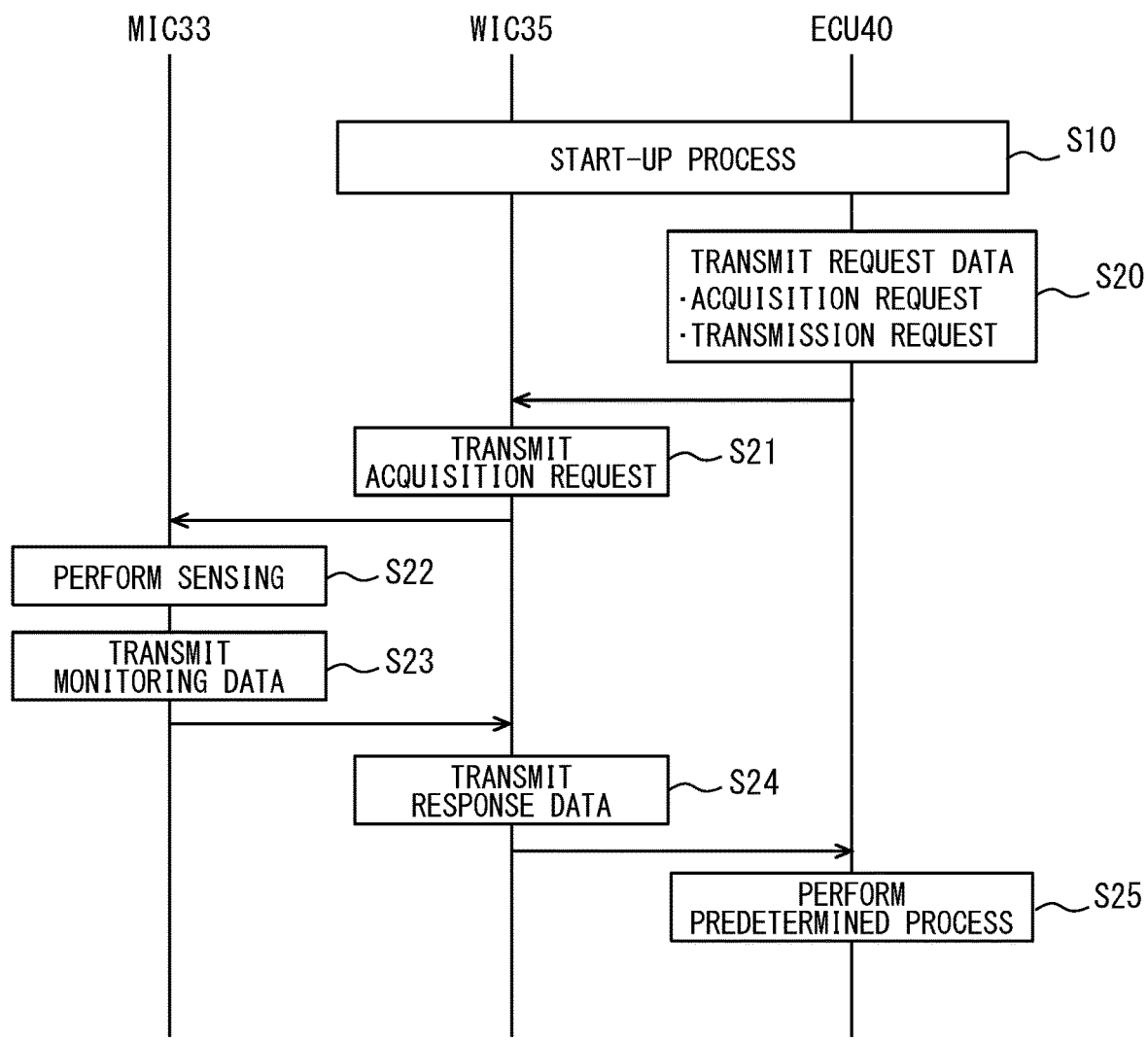
FIG. 5 is a diagram showing an example of a communication sequence between a monitoring device and a control device.

Next, wireless communication between the monitoring device 30 and the control device 40 is described with reference to FIG. 5. FIG. 5 is a diagram showing an example of a communication sequence between the monitoring device 30 and the control device 40. FIG. 5 describes wireless communication between one of the monitoring devices 30 and the control device 40. In FIG. 5, the monitoring IC 33 is shown as MIC33, the wireless IC35 is shown as WIC35, and the control device 40 is shown as ECU 40.

As shown in FIG. 5, first, the wireless IC 35 of the monitoring device 30 and the control device 40 execute a start-up process such as connection establishment (step S10). The start-up time may be, for example, time when an operating power is supplied. In a configuration in which electric power is constantly supplied from the battery stack 21 and the battery 15, the vehicle is started after the manufacturing process of the vehicle 10 or the replacement of parts at a repair shop. At startup, a start signal such as an IG signal may be supplied. For example, when an IG signal is switched from off to on by the user's operation, it is activated.

At startup, a start-up process is performed respectively for communication between the control device 40 and each of all the monitoring devices 30 to which wireless communication is connected to the control device 40. The start-up process includes, for example, (i) a connection establishment process for establishing a connection of wireless communication and (ii) a pairing process for exchanging unique information for encrypted communication. The start-up process includes a sharing process of sharing initial information regarding frequency channel hopping. The initial information includes, for example, a hopping pattern or a function for hopping.

When the process of step S10 is complete, the monitoring device 30 and the control device 40 cyclically execute data communication. As shown in FIG. 5, the control device 40 transmits the transmission data including (i) an acquisition request and (ii) a transmission request of the monitoring data including the battery information, that is, a request data to the monitoring device 30 (step S20).

When the wireless IC 35 of the monitoring device 30 receives a request data, it transmits an acquisition request for the monitoring data including the battery information to the monitoring IC 33 (step S21). In the present embodiment, the wireless IC 35 transmits an acquisition request to the monitoring IC 33 via the microcomputer 34.

Upon receiving an acquisition request, the monitoring IC 33 performs sensing (step S22). The monitoring IC 33 performs sensing and acquires the battery information of each of the battery cells 22 through the multiplexer 32. In addition, the monitoring IC 33 performs a circuit failure diagnosis.

Next, the monitoring IC 33 transmits the monitoring data including the battery information to the wireless IC 35 (step S23). In the present embodiment, the monitoring data including a failure diagnosis result is transmitted together with the battery information. The monitoring IC 33 transmits data to the wireless IC 35 via the microcomputer 34.

When the wireless IC 35 receives the monitoring data acquired by the monitoring IC 33, the wireless IC 35 transmits the transmission data including the monitoring data, that is, a response data to the control device 40 (step S24).

Upon receiving the response data, the control device 40 performs a predetermined process (step S25) based on the monitoring data. In the present embodiment, the control device 40 that performs a request process corresponds to a master device, and the monitoring device 30 that performs a response process corresponds to a slave device.

The processes of steps S20 to S25 described above are performed between the control device 40 and each of the monitoring devices 30. The battery management system 60 cyclically performs the processes of steps S20 to S25.

The control device 40 determines a frequency channel to use by performing frequency channel hopping for each data transmission/reception cycle, and transmits the request data and receives the response data on the determined frequency channel (frequency). The control device 40 performs frequency channel hopping according to the initial information until an unusable channel/channels described later is/are determined. When the unusable channel is determined, the control device 40 performs frequency channel hopping in consideration of the unusable channel(s).

Similarly, the monitoring device 30 also determines a frequency channel to use by performing frequency channel hopping for each transmission/reception cycle, and receives the request data and transmits the response data on the determined frequency channel (frequency). The monitoring device 30 performs frequency channel hopping according to the information shared with the control device 40. Therefore, the monitoring device 30 and the control device 40 can transmit and receive data using the same frequency channel. The control device 40 and the monitoring device 30 switch the target frequency channel for each transmission/reception cycle by performing frequency channel hopping.

<Learning Data>

Figure 6:
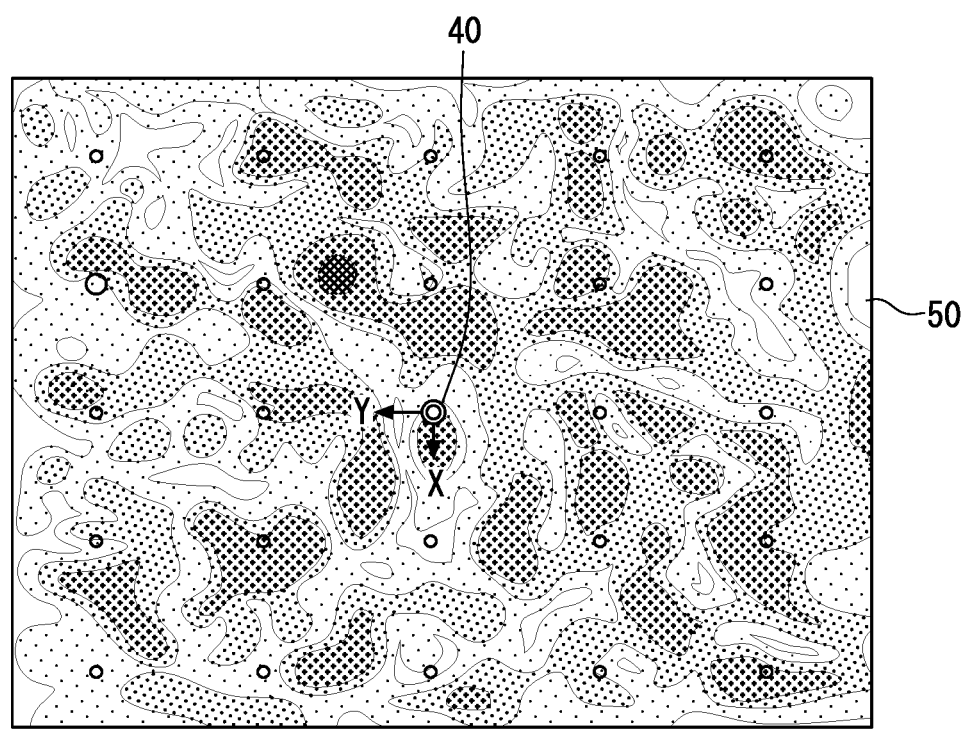
FIG. 6 is a diagram showing an electric field intensity distribution in a housing.

Next, the learning data is described with reference to FIG. 6. FIG. 6 is a diagram showing an electric field intensity distribution in the housing 50 of the battery pack 11. FIG. 6 shows the electromagnetic field simulation results at a predetermined timing at a predetermined frequency. In FIG. 6, as an example, the control device 40 (wave source) is provided substantially at the center of the metal housing 50.

When a radio wave having a predetermined frequency is radiated from the control device 40, a portion having a high electric field intensity and a portion having a low electric field intensity are generated in the housing 50 due to the interference between the transmitted wave and the reflected wave, as shown in FIG. 6. When the housing 50 is made of metal, it becomes more remarkable, but the same applies to the case made of resin. The reflected wave is generated by the reflection of the transmitted wave by the metal element constituting the battery pack 11, for example, the reflection by the housing 50, the reflection by a harness (not shown), and the like. Further, when the housing 50 is made of resin, the reflection of the transmitted wave may be caused by a metal member/body existing around the battery pack 11 in the vehicle 10, e.g., the reflection by the metal vehicle frame.

Further, in a closed space such as the housing 50, even if the phase changes, there are a portion having a generally high electric field intensity and a portion having a generally low electric field intensity. In particular, when the housing 50 is made of metal, a shielding function of the housing 50 makes it clear. The positions of the monitoring device 30 and the control device 40 are fixed in the housing 50 and, ultimately, in the vehicle 10. That is, the positions of the devices 30, 40 are a fixed position, respectively. In the vehicle 10 of the same type, the positions of the monitoring device 30 and the control device 40 are common (same) to each other.

In the present embodiment, the control device 40 has data that correlates with the electric field intensity in the housing 50 acquired in advance as learning data. The learning data is written in the learning data storage unit 442 of the wireless IC 44, for example, before the vehicle 10 is shipped, specifically at the time of manufacturing the battery pack 11. The learning data may be, for example, obtained by measurement on the vehicle 10 at a prototype stage, or may be obtained by electromagnetic field simulation. As described above, since the electric field intensity changes depending on the phase, it is preferable to use (i) data that correlates with an average value of the electric field intensity for a period of a predetermined time (duration) or (ii) data that correlates with the maximum value of the electric field intensity for a period of a predetermined time (duration).

The learning data includes at least data that correlates with the electric field intensity at the position of the control device 40 and data that correlates with the electric field intensity at the position of each of the monitoring devices 30. The positions of the monitoring device 30 and the control device 40 are preferably the positions of the antennas 37 and 42, but may be slightly deviated from the positions of the antennas 37 and 42. The learning data may be data that correlates with the electric field intensity at cell of a mesh that defines positions with respect to the housing 50. In such case, the positions and coordinates of the monitoring device 30 and the control device 40 may be linked. The data that correlates with the electric field intensity may be the electric field intensity itself, that is, the above-mentioned average value of the electric field intensity or the maximum value of the electric field intensity. Further, a correlation value other than the electric field intensity itself may be used. For example, the data may be data in which the electric field intensity is stratified by levels.

The learning data includes data that correlates with the electric field intensity for each of the frequency channels used for data communication between the control device 40 and the monitoring device 30, for example. The learning data may include data for some of the usable frequency channels. The learning data includes data that correlates with the electric field intensity for all the monitoring devices 30 that perform wireless communication with the control device 40. The learning data shows a relationship between the frequency channel (frequency) and the electric field intensity in the control device 40 and the monitoring device 30. In the following, the high and low electric field intensities of the control device 40 and the monitoring device 30 may simply be referred to as high and low electric field intensities.

<Determining a Target Channel>

Next, the process of determining a channel for use in communication (i.e., a target frequency channel using the learning data is described with reference to FIGS. 7 to 11.

The determination process is performed by the wireless IC 44 of the control device 40, which is a master device. The control device 40 determines a target frequency channel for frequency channel hopping. In the following, a frequency channel may be designated as "ch."

Figure 7:
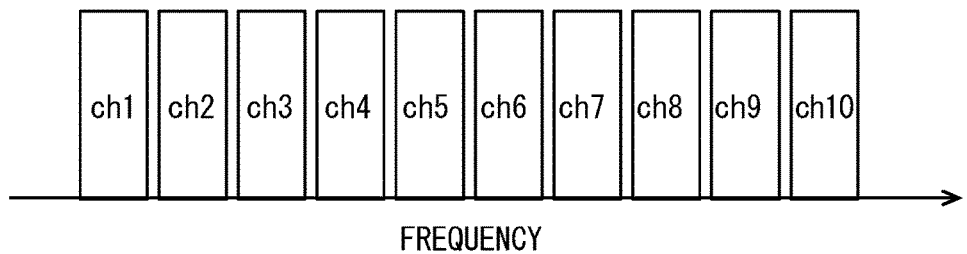
FIG. 7 is a flowchart showing an example of a target frequency channel determination process using learning data.

FIG. 7 shows an example of usable frequency channels. A usable channel is a frequency channel allocated for data communication among a plurality of frequency channels. As shown in FIG. 7, the usable frequency channels that can be used for data transmission/reception (data communication) between one monitoring device 30 and the control device 40 are predetermined.

As an example, in the present embodiment, a total of 10 channels from ch1 to ch10 are usable. The frequency channels have a predetermined frequency width (band width) and differ in frequency from each other. As shown in FIG. 7, the frequency of ch1 is the lowest and the frequency of ch10 is the highest. The number of frequency channels that are usable to transmit and receive data may be greater than or less than 10. The monitoring device 30 and the control device 40 may share, for example, information on usable frequency channels that are usable as initial information, or may have information on usable frequency channels that are common to each other in advance.

Figure 8:
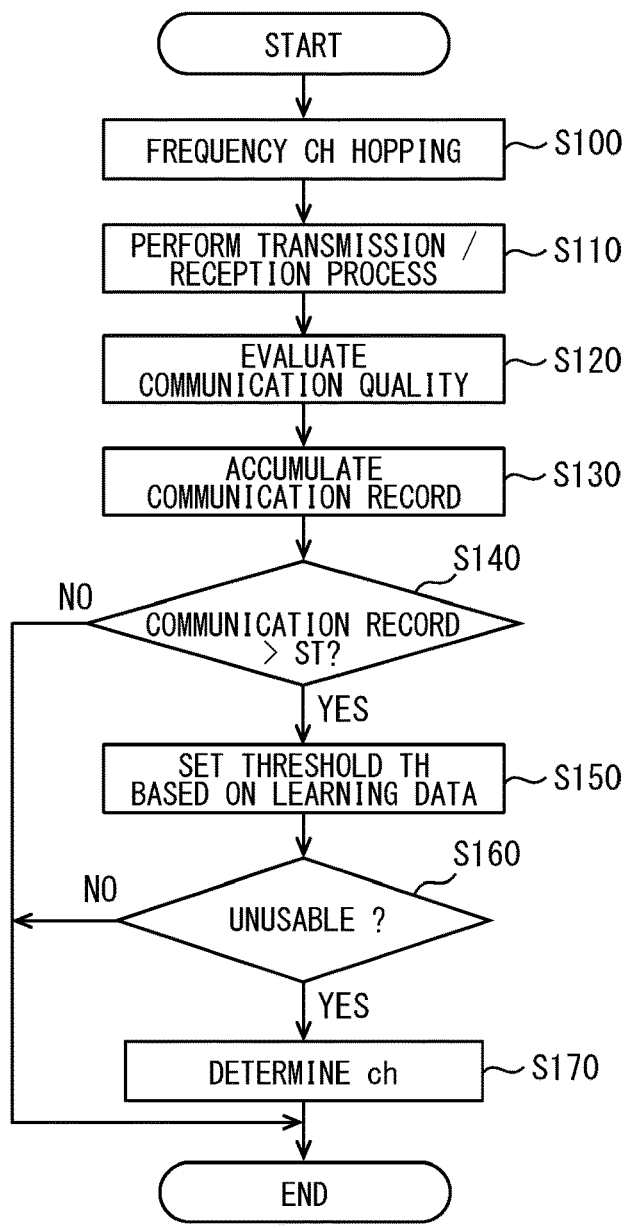
FIG. 8 is a diagram showing an example of usable frequency channels.

FIG. 8 shows an example of a target frequency channel determination process performed by the wireless IC 44 of the control device 40. First, the wireless IC 44 of the control device 40 performs frequency channel hopping in order to perform data communication with one monitoring device 30, and determines a frequency channel to be used in the current transmission/reception cycle (step S100) (i.e., communication at this time). As described above, the control device 40 performs frequency channel hopping for each data transmission/reception cycle.

The frequency channel hopping method is not particularly limited. As an example, the control device 40 of the present embodiment determines a frequency channel (i.e., target frequency channel) according to a frequency channel hopping pattern. In the following, the frequency channel hopping pattern may simply be designated as a hopping pattern. Alternatively, a predetermined function may be used to determine a frequency channel to use. Hopping patterns and functions are included in the above-described initial information, for example.

FIG. 9 shows an example of a hopping pattern. A hopping pattern shown in FIG. 9 is a pattern shared as initial information. That is, it is a hopping pattern before considering the unusable channel. In the present embodiment, "to-use" frequency channel (in hopping) is switched in an order of ch1→ch4→ch7→ch10→ch3→ch6→ch9→ch2→ch5→ch8→ch1. As described above, the process of shifting/hopping a frequency channel by a predetermined number can also be performed by using a function. For example, ch1 is used for the first data communication after performing the start-up process. Here, as an example, it is assumed that ch4 is determined as a frequency channel to use.

After performing step S100, the control device 40 performs a transmission/reception process on the determined frequency channel (step S110). The frequency channel hopping and transmission/reception process correspond to a transmission of the request data and a reception of the response data shown in FIG. 5. The monitoring device 30 also determines a frequency channel to use according to the hopping pattern common to the control device 40 before performing the transmission/reception process. For example, in a transmission/reception cycle in which the control device 40 determines ch4, the monitoring device also determines ch4.

After performing step S110, the control device 40 evaluates a communication quality (step S120) and accumulates the communication quality as a communication record (step S130). The control device 40 evaluates the quality of communication performed at this time (i.e., in, for example, current transmission/reception cycle) based on the transmission/reception result in step S110. The control device 40 evaluates whether the communication quality is normal or deteriorated. The control device 40 accumulates the communication evaluation results for each of the frequency channels as communication record.

The control device 40 evaluates the communication quality based on, for example, information regarding a reception state of the response data (i.e., response signal). The control device 40 may evaluate the communication quality as deterioration when, for example, the response data cannot be received. When the control device 40 detects a communication error by an inspection performed at the time of reception, that is for example, an inspection using an error detection code, although data has been received, it may be evaluated as a communication quality deterioration. The control device 40 may evaluate the communication quality as deterioration when, for example, a retransmission process is required. That is, when communication is not established, it may be evaluated as deterioration of communication quality. The control device 40 may evaluate the communication quality as deterioration when the received signal intensity (RSSI) is lower than a predetermined value, for example. RSSI is an abbreviation for Received Signal Intensity Indicator. The control device 40 evaluate the communication quality as having normal quality when communication evaluation criteria are satisfied.

The control device 40 may acquire information on the reception state of the request data (i.e., request signal) from the monitoring device 30 as a part of the communication data for evaluating the communication quality. The control device 40, which is a master device, evaluates the communication quality based on the information regarding the reception state of the request data and/or the information regarding the reception state of the response data, and accumulates the evaluation as a communication record.

FIG. 10 shows the communication record of each frequency channel. In FIG. 10, for clarification, hatching is applied to the communication quality deterioration results among the communication records. In such manner, the control device 40 accumulates the evaluation record of normal communication quality or the evaluation record of deterioration of communication quality as the communication record each time step S130 is performed. In such manner, the communication record for the frequency channel actually used is increased by one record.

After performing step S130, the control device 40 determines whether or not the number of communication records of a frequency channel actually used at this time (e.g., in current cycle) has exceeded a reference number ST (step S140).

As described above, the phase of the signal changes. Therefore, it may be preferable to determine unusability in step S160 after accumulation of the communication record for the phase of 360 degrees range, or more preferably after accumulation of a plurality of times of 360 degrees range phase change. In consideration of such point, in the present embodiment, the reference number ST is set within a range of 1000 to tens of thousands. The reference number ST of the present embodiment is a predetermined value (i.e., fixed value). The reference number ST is stored in advance in, for example, a memory of the microcomputer 441.

When it is determined in step S140 that the number of the communication records is equal to or less than the reference number ST, the control device 40 ends a series of processes. The control device 40 maintains a target frequency channel that is currently set for use in frequency channel hopping.

When it is determined in step S140 that the number of the communication records exceeds the reference number ST, the control device 40 sets a threshold value TH based on the learning data (step S150). The control device 40 sets the threshold value TH for a frequency channel which has been used in the transmission/reception process performed in step S110. As shown by a broken line in FIG. 10, the threshold value TH is set individually/differently for respective frequency channels based on the learning data. In the present embodiment, the electric field intensity in the control device 40 and one monitoring device 30 when ch4 is used is lower than when the other channels 1 to 3, 5 to 10 are used. Therefore, the control device 40 sets the threshold value TH of ch4 to a value lower than the threshold values TH of the other channels 1 to 3, 5 to 10. That is, a threshold value (TH) of ch4 is set so that ch4 can be easily determined as unusable.

After performing step S150, the control device 40 performs unusability determination of the frequency channel used for communication at this time (e.g., in current cycle) (step S160). The control device 40 determines whether or not a channel is usable for the next and subsequent times, by comparing (i) a value that correlates with the deterioration of communication quality in the communication record of the frequency channel used for communication and (ii) the threshold value TH. The value that correlates with the communication quality in the communication record is, for example, a ratio of the communication quality deterioration records in the communication records. Instead of using a ratio, the number of communication quality deterioration records may also be used.

When the correlation value of communication quality deterioration is equal to or less than the threshold value TH in step S160, the control device 40 determines that there is no problem in using, for communication of next and subsequent times, the frequency channel used for communication at this time, and ends a series of processes. That is, the control device 40 maintains the frequency channel currently set as a target frequency channel of frequency channel hopping (i.e., keeps it unchanged).

When the correlation value of communication quality deterioration exceeds the threshold value TH in step S160, the control device 40 determines that the frequency channel used for communication at this time cannot be used from the next and subsequent times, and sets it as an unusable channel. For example, in FIG. 10, the ratio of communication quality deterioration of ch4 exceeds the threshold value TH. In such case, the control device 40 determines that ch4 is unusable and sets it as an unusable channel.

When it is determined that a channel is unusable, the control device 40 determines a target frequency channel (step S170), and ends a series of processes. The control device 40 determines a target frequency channel by excluding an unusable channel from the target frequency channels of frequency channel hopping.

FIG. 11 shows an example of a hopping pattern considering an unusable channel. The control device 40 excludes, for example, ch4, which is an unusable channel, from the hopping pattern. When frequency channel hopping is performed in the cycle following the transmission/reception cycle using ch1, the frequency channel to use is switched to ch7. Non-use of the unusable channel may be realized by performing frequency channel hopping again when the unusable channel is selected, that is, without excluding it from the hopping pattern.

The control device 40 repeatedly performs the processes of steps S100 to S170 after the above-mentioned start-up process is complete. The control device 40 performs a target frequency channel determination process in transmitting and receiving data to and from each of the monitoring devices 30.

<Sharing Process>

Figure 12:
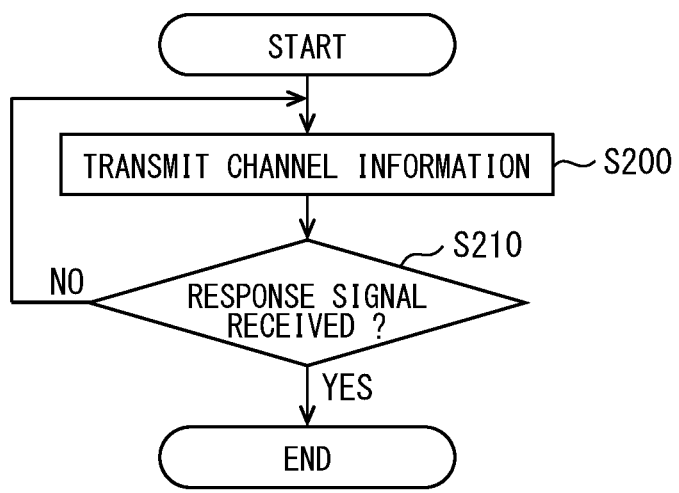
FIG. 12 is a flowchart showing an example of a sharing process.
Figure 13:
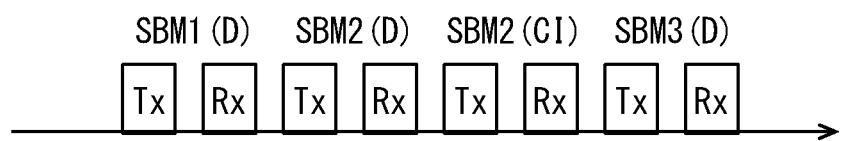
FIG. 13 is a timing chart showing an example of data communication including shared information.

Next, information sharing with the monitoring device 30 which is a slave device is described with reference to FIGS. 12 and 13. FIG. 12 is a flowchart showing an example of a sharing process performed by the control device 40. FIG. 13 is a timing chart showing an example of data communication including channel information.

The control device 40 performs the process shown in FIG. 12 with the process of step S170 described above as a trigger. As shown in FIG. 12, the wireless IC 44 of the control device 40 transmits data including channel information to the monitoring device 30 (step S200). The channel information is, for example, information on a frequency channel determined as an unusable channel. The channel information may be, for example, information on a target frequency channel after excluding the unusable channel.

After performing step S200, the control device 40 determines whether or not a response signal to a transmission signal of step S200 has been received within a predetermined time after performing a transmission process of step S200 (step S210). When the response signal is received, a series of process ends. When the response signal is not received, the process of step S200 is performed again.

FIG. 13 shows an example in which the control device 40 transmits/receives data to/from each of the three monitoring devices 30, specifically SBM1, SBM2, and SBM3. FIG. 13 shows an example in which one of the frequency channels with SBM2 is determined as unusable. Tx indicates data transmission and Rx indicates data reception. SBM1 (D), SBM2 (D), and SBM3 (D) indicate transmission/reception of a request and response of the monitoring data. SBM2 (CI) indicates the transmission and reception of data including channel information (CI).

After performing data transmission/reception with SBM2, the control device 40 continuously transmits/receives data including channel information to/from SBM2. The control device 40 shares channel information with SBM 2 before performing communication with SBM 3. The transmission/reception of channel information may be performed before the frequency channel once determined as unusable is used again in SBM2. For example, in the hopping pattern shown in FIG. 9, the unusability information on ch4 may be transmitted after the transmission/reception of data using ch9. In such case, channel information can be shared with SBM2 using ch9. The channel information is information about frequency channel hopping that is shared later and is different from the initial information.

Summary of First Embodiment

As described above, the positions of the monitoring device 30 and the control device 40 are fixed in the housing 50, and thus in the vehicle 10. When radio waves of a predetermined frequency (i.e., of a predetermined channel) are radiated from the control device 40, which is a master device, a portion having a high electric field intensity and a portion having a low electric field intensity are generated in the housing 50 due to the interference between the transmitted wave and the reflected wave. In a closed space such as the housing 50, even if the phase changes, there are a portion having a generally high electric field intensity and a portion having a generally low electric field intensity. When the electric field intensity in the monitoring device 30 and the control device 40 is low, the communication quality is more likely to be deteriorated, causing communication failure or deterioration of the received signal, as compared with the case where the electric field intensity is high. That is, in the positional relationship between the monitoring device 30 and the control device 40, there are frequency channels (frequencies) in which the communication quality is likely to deteriorate and frequency channels in which the communication quality is unlikely to deteriorate.

The control device 40 of the present embodiment has data that correlates with the electric field intensity in the housing 50 as learning data in advance. The learning data is data that correlates with the electric field intensity in the housing 50 for usable frequency channels that are usable for data transmission/reception with the monitoring device 30 that is a slave device. The control device 40 excludes frequency channels whose communication quality is likely to deteriorate from the target frequency channels of frequency channel hopping based on the data correlating with the electric field intensity. That is, a frequency channel whose communication quality is unlikely to deteriorate is determined as a target frequency channel for use in frequency channel hopping. As a result, it is possible to provide the battery management system 60 capable of highly reliable wireless communication. As a result, it is possible to suppress the occurrence of communication failure. That is, it is possible to suppress the loss of monitoring data such as the battery information.

In case of performing wireless communication, the communication speed is slower than that of wired communication, and the communication frequency is often low. Therefore, if an abnormality occurs in at least one of the physical quantities such as voltage, or if an abnormality is detected by the failure diagnosis information, or if the monitoring data is missing, a value may be changed suddenly. If the value is changed suddenly, a control is changed suddenly, and although there may be no problem in safety, there is a risk that operability is affected. On the other hand, according to the present embodiment, it is possible to suppress the lack of monitoring data indicating an abnormality. Thereby, the influence on the operability can be suppressed.

Further, by suppressing the lack of monitoring data, it is possible to accurately estimate the factors estimated by the accumulation of monitoring data, for example, the accumulation of battery damage. In addition, the abnormality may be detected by examining the number of times the threshold value is exceeded. In such case as well, by suppressing the loss of monitoring data, it is possible to accelerate the detection timing of the abnormality.

The electric field intensity is also affected by factors other than the initially determined factors (initial factors) such as the above-mentioned arrangement and frequency channel (frequency). The electric field intensity in the housing 50 can be changed by variable factors (i.e., unstable factors) such as temperature, humidity, foreign matter, and vibration of the use environment. For example, when temperature rises, the electric field intensity decreases as compared with the case where temperature is low. When humidity becomes high, the electric field intensity decreases due to the influence of moisture in the air. The electric field intensity is also reduced by foreign matter such as dust. Further, when the position of a metal body such as a harness shifts due to vibration, the electric field intensity changes. When the propagation path of radio waves shifts due to vibration, the electric field intensity changes.

The control device 40 of the present embodiment evaluates the communication quality based on the result of transmitting and receiving data in a predetermined frequency channel, and accumulates evaluation as a communication record. Then, upon seeing that the value correlating with the communication quality deterioration in the communication record exceeds the threshold value TH, the predetermined frequency channel is determined as unusable and excluded from the target frequency channels. In such manner, it is determined whether or not a certain channel is unusable by using a value based on the actual transmission/reception result, specifically, a value that correlates with the deterioration of communication quality in the communication record. Thus, the system makes it possible to consider (i.e., reflect) the influence of variable factors such as temperature, vibration and the like.

Further, the control device 40 sets the threshold value TH for each of the frequency channels based on the learning data. That is, the threshold value TH is set individually for the frequency channel based on the electric field intensity. For example, the threshold value TH of a frequency channel having a low electric field intensity is made stricter than the threshold value TH of a frequency channel having a high electric field intensity. In the present embodiment, the influence of the initial factors and the influence of the variable factors are taken into consideration, so that the reliability of wireless communication can be further improved.

If one threshold value TH is common (i.e., commonly used) among the usable frequency channels, communication failures may unnecessarily occur due to the use of the common threshold value TH among different channels. According to the present embodiment, since a different threshold value TH is set for respective frequency channels in consideration of the influence of the initial factors, the threshold value TH is reached/satisfied quickly for the frequency channel having a low electric field intensity. As a result, it is possible to reduce the number of failures of communication and, ultimately, suppress the loss of battery information.

Modifications

An example is shown in which the reference number ST used in the process of step S140 is set to a fixed value, but the present disclosure is not limited to such example. The reference number ST may also be set for each of the frequency channels based on the learning data. That is, the reference number ST of the frequency channel(s) having a low electric field intensity in the monitoring device 30 and the control device 40 may be made smaller than the reference number ST of the frequency channel(s) having a high electric field intensity.

Although not particularly mentioned, the communication quality of the transmission/reception result of the sharing process shown in FIG. 12 may also be evaluated and accumulated as a communication record.

An example is shown in which the frequency channel determined as unusable is excluded and the next frequency channel in the hopping pattern is used, but the present disclosure is not limited to such example. After excluding the frequency channel determined as unusable and using a predetermined frequency channel that does not follow an initial rule, the initial hopping pattern may be returned/restored. The frequency channel after the unusability determination may be determined by adding a predetermined number to the number of unusable channel. For example, if it is determined that ch4 cannot be used, ch10 which is a result of addition of a predetermined number of 6 added to ch4 may be used, and after ch10, ch7 may be used by returning to the initial hopping pattern. When the predetermined number is made larger than the normal hopping interval, the frequency channel to use next time can be further separated from the unusable channel. The same applies when using a function.

Further, the frequency channel to use after unusability determination may be determined in advance. For example, after the unusability determination, ch2 may always be used, and then the frequency channel to use may be determined by a hopping pattern or by a function.

The timing at which the control device 40 sets the threshold value TH is not limited to step S150. The threshold value TH may be set by the control device 40 at any timing before performing the unusability determination process (step S160). The control device 40 may set the threshold value TH individually/differently for all the frequency channels, for example, after performing the start-up process and before performing the data communication. According to such setting scheme, it is not necessary to set the threshold value TH every time the number of communication records exceeds the reference number ST.

An example is shown in which the control device 40 transmits channel information (CI) to SBM 2 when it determines that one of the frequency channels is unusable in the target frequency channel determination process with one monitoring device 30 (SBM2), but the present disclosure is not limited to such example. Channel information may be transmitted not only to SBM2 but also to other monitoring devices (SBM1, SBM3). For example, channel information may be transmitted to SBM1 following SBM1 (D) shown in FIG. 13, and channel information may be transmitted to SBM3 following SBM3 (D). That is, the unusable channel may be shared by all monitoring devices 30 that wirelessly communicate with the control device 40.

Frequency channel information may be used as the learning data. The frequency channel information is, for example, information on a frequency channel having an electric field intensity higher than a predetermined threshold value and/or information on a frequency channel having an electric field intensity lower than a predetermined threshold value. As the learning data, data for each (all) of usable frequency channels may be provided, or data for a part of the frequency channels may be provided. For example, when the learning data includes (i) frequency channel information in which the electric field intensity is lower than a predetermined threshold value and (ii) frequency channel information in which the electric field intensity is higher than the threshold value, the threshold value TH of the frequency channel having a low electric field intensity is set to a lower value than the threshold value TH of the frequency channel having a high electric field intensity. For example, when the learning data includes only frequency channel information whose electric field intensity is lower than a predetermined threshold, for example, the threshold value TH of the frequency channel included in the learning data is set to a lower value than the threshold value TH of the frequency channel not included in the learning data.

Second Embodiment

The second embodiment is a modification of a preceding embodiment as a basic configuration and may incorporate description of the preceding embodiment. In the preceding embodiment, the unusability is determined by accumulating the communication records for each of the frequency channels. Instead of the above, the unusability may be determined by accumulating the communication record for each of groups respectively having a plurality of consecutive frequency channels as one unit.

Figure 14:
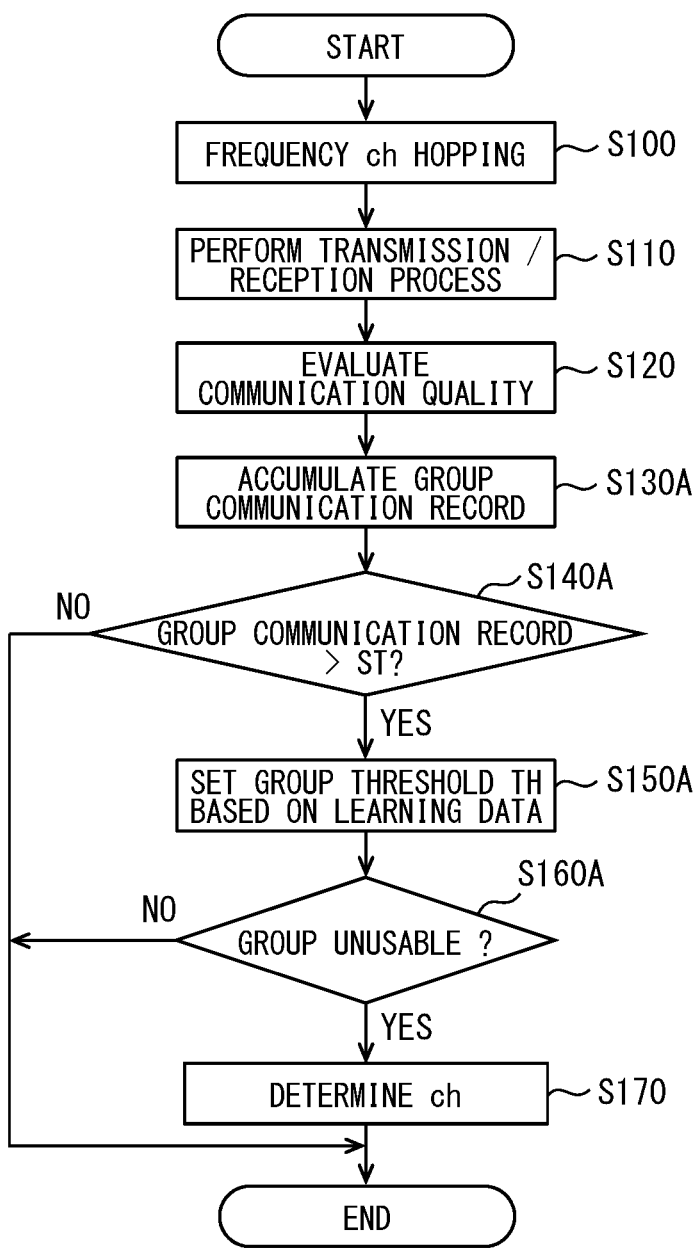
FIG. 14 is a flowchart showing an example of a target frequency channel determination process performed by the control device in the battery management system according to a second embodiment.
Figure 15:
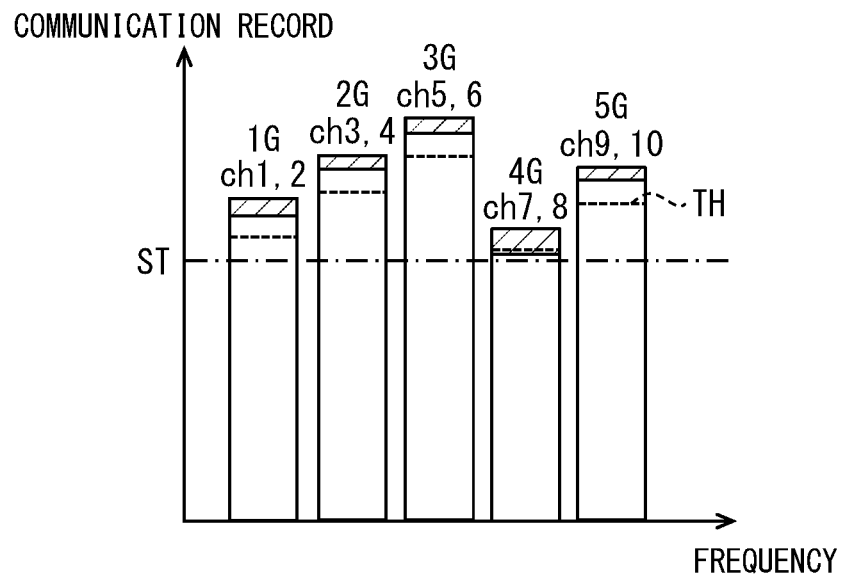
FIG. 15 is a diagram showing an example of a threshold value set based on communication record of each of groups and learning data.

FIG. 14 shows an example of the target frequency channel determination process performed by the control device 40 in the battery management system 60 according to the present embodiment. FIG. 15 shows an example of the threshold value TH set based on the communication records of each of the groups and the learning data. In FIG. 15, as in FIG. 10, the threshold value TH is indicated by a broken line. Further, for clarification, hatching is applied to the record(s) showing deterioration of communication quality among the communication records.

The processes of steps S100 to S120 shown in FIG. 14 are the same as the processes of steps S100 to S120 shown in FIG. 8 of the preceding embodiment. The control device 40 (i.e., wireless IC 44) determines a frequency channel to use by frequency channel hopping, and performs data transmission/reception process with one monitoring device 30. Then, the communication quality is evaluated based on the transmission/reception result.

After performing step S120, the control device 40 accumulates the result of the communication quality evaluation performed in step S120 as the communication records of the group, or as group communication record (step S130A). The control device 40 of the present embodiment does not individually/separately accumulate communication record for each of the frequency channels.

The control device 40 sets a group having a plurality of frequency channels that are continuous with each other as one unit, and accumulates communication records for a unit of each of the groups.

As shown in FIG. 15, for example, the control device 40 divides the usable 10 channels into 5 groups of 2 channels each. In FIG. 15, the first group (1G) includes ch1 and ch2. The second group (2G) includes ch3 and ch4. The third group (3G) includes ch5 and ch6. The fourth group (4G) includes ch7 and ch8. The fifth group (5G) includes ch9 and ch10. For example, the control device 40 accumulates the communication quality evaluation result of ch1 and the communication quality evaluation result of ch2 as the communication record of the first group (1G).

After performing step S130A, the control device 40 determines whether or not the communication record of the group including the frequency channel used at this time exceeds the reference number ST (step S140A). When it is determined in step S140A that the communication record of the group is equal to or less than the reference number ST, the control device 40 ends a series of processes. The control device 40 determines that the frequency channel currently set as a target frequency channel should remain unchanged as is in frequency channel hopping.

When it is determined in step S140A that the group communication records have exceeded the reference number ST, the control device 40 sets the threshold value TH of the group based on the learning data (step S150A). The control device 40 sets the threshold value TH for the group including the frequency channel used for communication in the transmission/reception process in step S110. As shown by the broken line in FIG. 15, the threshold value TH is set individually for each of the groups based on the learning data. In the present embodiment, since the electric field intensity of ch7 and/or ch8 is low, the threshold value TH of the fourth group (4G) including ch7 and ch8 is set to have a lower value than the threshold value TH of the other groups (1G to 3G, 5G).

After performing step S150A, the control device 40 performs the unusability determination of the group including the frequency channel used for communication at this time (step S160A). The control device 40 determines whether or not the relevant group is unusable at the next time and onward by comparing (i) a value that correlates with the communication quality deterioration in the communication record of the relevant group with (ii) the threshold value TH.

When the value correlating with the communication quality deterioration in step S160A is equal to or less than the threshold value TH, the control device 40 determines that there is no problem in using the relevant group at the next time and onward, and ends a series of processes. That is, the control device 40 determines that the frequency channel currently set as the target frequency channel for use in frequency channel hopping should remain unchanged.

When the value correlating with the deterioration of communication quality has exceeded the threshold value TH in step S160A, the control device 40 determines that the relevant group is unusable at the next time and onward. The control device 40 determines that all frequency channels in the relevant group are unusable. For example, in FIG. 15, the ratio of communication quality deterioration in the fourth group (4G) exceeds the threshold value TH, and the control device 40 determines that the fourth group, that is, ch7 and ch8, is unusable.

When it is determined that a group is unusable, the control device 40 performs the process of step S170, and ends a series of processes as in FIG. 8. The control device 40 determines the target frequency channel(s) by excluding the frequency channel(s) included in the unusable group from the target frequency channel of frequency channel hopping. For example, when the hopping pattern shown in FIG. 9 is used and it is determined that the fourth group is unusable, ch7 and ch8 may be excluded to determine a new hopping pattern. Alternatively, the unusable channel may remain in the hopping pattern, but not used by performing frequency channel hopping again when the unusable channel (e.g., ch7 or ch8) is selected.

Summary of Second Embodiment

According to the present embodiment, the same effects as those of the configuration described in the preceding embodiment are obtainable. Specifically, the control device 40 evaluates the communication quality based on the transmission/reception result of data in a predetermined frequency channel, and accumulates the communication record in a unit of groups. Then, when the value correlating with the communication quality deterioration in the communication record of the group exceeds the threshold value TH, all the frequency channels in the group are determined as unusable and excluded from the target frequency channel(s). In such manner, it is determined whether or not the channel or channels are unusable by using a value based on the actual data transmission/reception result, specifically, a value that correlates with the deterioration of communication quality in the communication record. Thus, the system makes it possible to consider (i.e., reflect) the influence of variable factors such as temperature, vibration and the like.

Further, the control device 40 sets the threshold value TH for each of the groups based on the learning data. That is, the threshold value TH is set individually, e.g., differently, for the respective groups based on the electric field intensity.

Two or more, close and "consecutive" frequencies have similar (i.e., substantially same level) electric field intensities with each other than the two or more, far apart frequencies. Therefore, even by setting a single threshold value TH for a group of channels (i.e., for a group of frequencies), the reliability of wireless communication is improvable in consideration of the influence of the initial factors.

In the present embodiment, the communication record and the threshold value TH are managed in a unit of groups, and the unusability is determined in such a unit. Thereby, the process load of the control device 40 (i.e., a master device) is reducible.

The configuration described in the present embodiment is combinable with the configuration described in the preceding embodiment and the modification(s) thereof, except that a unit of frequency channel is replaced with a unit of group of frequency channels.

Third Embodiment

The present embodiment is a modification of a preceding embodiment as a basic configuration and may incorporate description of the preceding embodiment. The frequency channel determined as unusable may be excluded from among the targets of frequency channel hopping after the determination. Instead of the above, the exclude channel may be restored (i.e., returned to serve as the usable channels) when a predetermined condition is satisfied.

Figure 16:
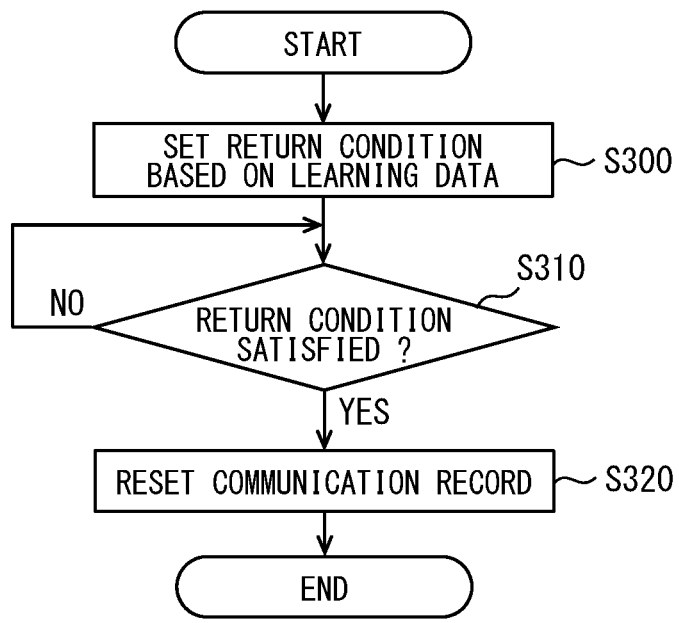
FIG. 16 is a flowchart showing an example of a return process performed by the control device in the battery management system according to a third embodiment.

FIG. 16 shows an example of a return process performed by the control device 40 in the battery management system 60 according to the present embodiment. When an unusable channel is set, the control device 40 performs the return process shown below.

As shown in FIG. 16, first, the control device 40 sets a return condition based on the learning data (step S300). When the threshold value TH is set individually for each of the frequency channels, the control device 40 sets the return condition individually for each of the frequency channels. When the threshold value TH is set individually for each of the groups, the control device 40 sets the return condition individually for each of the groups.

The return condition may be the number of transmissions/receptions after the unusability determination, that is for example, the number of times the monitoring data is received. Further, the number of times the start signal such as an IG signal is turned on and off may also be used, or a travel distance of the vehicle 10 may also be used. For example, in case of using the number of times the start signal is turned on and off, the control device 40 sets the number of times required to restore the frequency channel having a low electric field intensity to be larger than the number of times required to restore the frequency channel having a high electric field intensity based on the learning data.

After performing step S300, the control device 40 determines whether or not the return condition is satisfied (step S310). When it is determined that the return condition is not satisfied, the process of step S310 is performed again.

When it is determined in step S310 that the return condition is satisfied, the control device 40 resets the communication record (step S320) and ends a series of processes. When the return condition is set individually for the respective frequency channels, at least the communication record of the frequency channel that satisfies the return condition is reset, and the frequency channel that has been determined as unusable is returned to the target/usable frequency channels. When the return condition is set individually for the respective groups, at least the group communication record that satisfies the return condition is reset, and all the frequency channels included in such group are returned to the target/usable frequency channels.

When one frequency channel or one group satisfies the return condition, the control device 40 may reset only the communication record of the frequency channel or group that satisfies the return condition. The control device 40 may also reset the communication record for all the usable frequency channels (for example, 10 channels) that are usable for transmitting and receiving data. That is, all communication records may be reset at once.

Summary of Third Embodiment

According to the present embodiment, the learning data is used as the return condition for returning/restoring the unusable channel(s). By using the learning data, there is a difference in a return time. Frequency channels with low electric field intensity, that is, frequency channels whose communication quality tend to deteriorate, are difficult to return (i.e., are configured to be harder to be returned/restored). On the other hand, frequency channels having a high electric field intensity, that is, frequency channels whose communication quality is not likely to deteriorate, is likely to return. As a result, the number of times communication quality deterioration occurs is reducible as compared with a configuration in which the return condition is uniform. Therefore, the reliability of the system is further improvable.

The configuration described in the present embodiment is combinable with either the configuration described in the first embodiment or the configuration described in the second embodiment.

Fourth Embodiment

The present embodiment is a modification of a preceding embodiment which serves as a basic configuration, and may incorporate description of the preceding embodiment(s). In the preceding embodiment(s), the relationship between the execution timing of the target frequency channel determination process and a travel state of the vehicle 10 is not particularly mentioned. Instead of the above, the target frequency channel determination process may be performed in association with the travel state of the vehicle 10.

Figure 17:
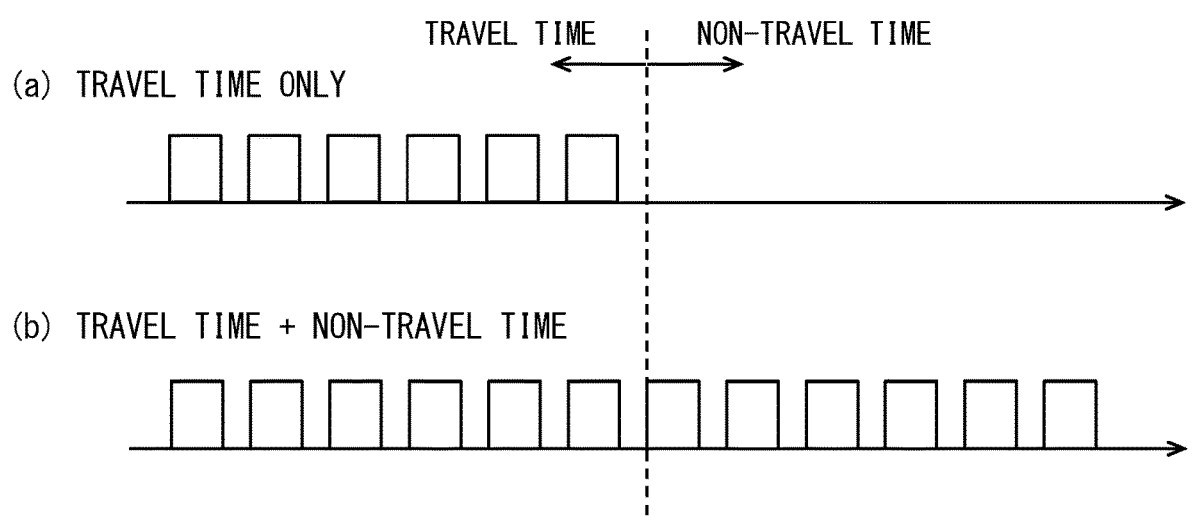
FIG. 17 is a timing chart showing an execution timing of a target frequency channel determination process in the battery management system according to a fourth embodiment.

FIG. 17 shows the process timing of step S110, that is, the timing of data transmission/reception process in the battery management system 60 according to the present embodiment. As shown in (a) portion of FIG. 17, the control device 40 may perform the target frequency channel determination process including the data transmission/reception process only during traveling of the vehicle 10. That is, the target frequency channel determination process may be configured not to be performed when the vehicle is not traveling.

As shown in (b) portion of FIG. 17, the control device 40 may perform the target frequency channel determination process including the data transmission/reception process during traveling (travel time) and non-traveling (non-travel time). That is, the target frequency channel determination process may be performed when the vehicle is not traveling. The non-travel time is a period in which the start signal such as an IG signal is off, or the start signal remains on and the vehicle 10 is being parked or stopped. Even when the start signal is off, if the battery stack 21 or the battery 15 is configured to constantly supply electric power to the system, the control device 40 can perform the target frequency channel determination process even when the vehicle is not traveling.

Note that the sharing process shown in FIG. 12 and the return process shown in FIG. 16 can be performed together with the target frequency channel determination process. In other words, the target frequency channel determination process, the share process, and the return process may all be performed when the vehicle is not traveling.

Summary of Fourth Embodiment

According to the present embodiment, it is possible to perform the target frequency channel determination process in association with the travel state of the vehicle. When not traveling, (i) a temperature is lower, (ii) a load of the assembled battery 20 is lower, and there is less vibration. In such manner, the influence of these variable factors is small when not traveling. Therefore, the initial factors, that is, the level of the electric field intensity in the control device 40 and the monitoring device 30, greatly affects the communication quality. By using the learning data of the electric field intensity, it is possible to improve the determination accuracy of the unusable channel.

In the present embodiment, an example of performing the target frequency channel determination process only during traveling, or during traveling and non-traveling is shown. For example, during traveling, only the processes of steps S100 and S110 may be performed, and during non-traveling, the processes of steps S100 to S170 may be performed. When traveling, only the processes of steps S100 to Si 30 may be performed, and when not traveling, the processes of steps S100 to S170 may be performed. In such manner, the process load and communication load of the control device 40 during traveling is reducible.

The configuration described in the present embodiment is combinable with any of the configuration described in the first embodiment, the configuration described in the second embodiment, and the configuration described in the third embodiment.

Fifth Embodiment

The present embodiment is a modification of a preceding embodiment which serves as a basic configuration, and may incorporate description of the preceding embodiment. In the preceding embodiment(s), the threshold value for determining an unusable channel is set based on the learning data. Alternatively, the target frequency channels for frequency channel hopping may directly be determined based on the learning data.

Figure 18:
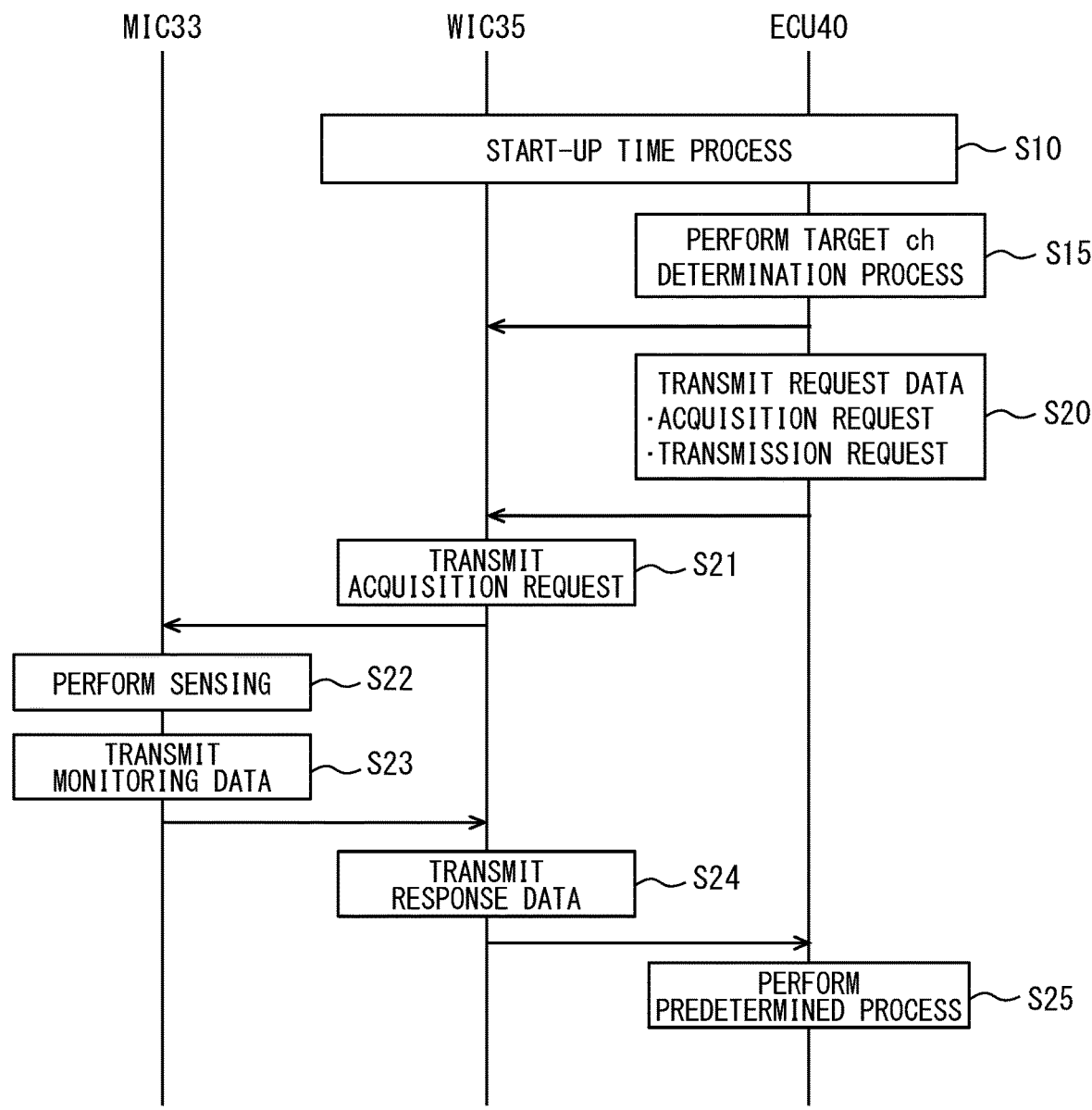
FIG. 18 is a diagram showing an example of a communication sequence in the battery management system according to a fifth embodiment.

FIG. 18 shows an example of a communication sequence between the monitoring device 30 and the control device 40 in the battery management system 60 according to the present embodiment. FIG. 18 shows the execution timing of the target frequency channel determination process. In FIG. 18, as in FIG. 5, the monitoring IC 33 is shown as a MIC33, the wireless IC35 is shown as a WIC35, and the control device 40 is shown as an ECU 40.

As shown in FIG. 18, the control device 40 performs the target frequency channel determination process after performing the process of step S10, that is, the start-up process, and before performing a data communication process in and after step S20 (step S15).

The control device 40 determines the target frequency channel(s) for frequency channel hopping based on the initial information and the above-mentioned learning data.

The control device 40 does not use the frequency channels having a low electric field intensity in the control device 40 and the monitoring device 30 among the plurality of usable frequency channels, and determines the frequency channels having a high electric field intensity as the target frequency channel(s). For example, a frequency channel having an electric field intensity higher than a predetermined threshold value is used as the target frequency channel, and a frequency channel having an electric field intensity lower than the threshold value is set as unusable.

The control device 40 shares the frequency channel information determined in step S15 with the monitoring device 30 by transmitting target frequency channel information to the wireless IC 35 of the monitoring device 30. In the start-up process, the control device 40 and the monitoring device 30 share the initial information regarding frequency channel hopping. The control device 40 performs frequency channel hopping according to the initial information, and transmits the target frequency channel information on a predetermined frequency channel. Since frequency channel hopping is performed according to the initial information, the control device 40 and the monitoring device 30 can use a common frequency channel and can share the channel information of the target frequency channel.

The process of step S15 described above is performed between the control device 40 and each of the monitoring devices 30. After performing step S15, the control device 40 performs the request data transmission process (step S20). The control device 40 performs frequency channel hopping on the frequency channel determined in step S15 as the target frequency channel, and determines a frequency channel to use for frequency channel hopping. The control device 40 transmits the request data on the determined frequency channel (i.e., on the determined frequency). After performing step S15, the battery management system 60 cyclically performs the processes of steps S20 to S25.

Summary of Fifth Embodiment

According to the present embodiment, the control device 40, which is a master device, performs the target frequency channel determination process after performing the start-up process. Before transmitting and receiving data, the control device 40 determines the frequency channel used in frequency channel hopping based on the learning data stored in advance. The control device 40 does not have to perform the target channel determination process during cyclic data communication with the monitoring device 30. As a result, the communication load is reducible.

The control device 40 may evaluate the communication quality along with the transmission and reception of data, and may accumulate the evaluation result as a communication record. That is, the processes of steps S100 to S130 (S130A) may be cyclically performed. By accumulating communication records, the accumulated records are usable for updating the learning data, which is described later.

An example is shown in which the target frequency channel determination process is performed after performing the start-up process. However, the present disclosure is not limited to such example. The control device 40 may perform the target frequency channel determination process at any time, as long as performing the target frequency channel determination process between the time when the control device 40 is started and the time when the data is transmitted/received to/from the monitoring device 30. For example, the target frequency channel determination process may be included in the start-up process.

When the learning data has a fixed value, that is, when the learning data update described later is not performed, the control device 40 and the monitoring device 30 may perform the target frequency channel determination process based on the learning data, respectively. The monitoring device 30 also stores, in advance, the learning data having the same contents as the control device 40. The process contents of the target frequency channel determination process is common to the control device 40 and the monitoring device 30. Thus, the frequency channel(s) used in frequency channel hopping is/are sharable without performing data communication.

As described in the preceding embodiment(s), as the learning data, information on a frequency channel having an electric field intensity higher than a predetermined threshold value may be used, or information on a frequency channel having an electric field intensity lower than a predetermined threshold value may be used, for example. The learning data may include information on target frequency channels and/or information on unusable frequency channels.

Sixth Embodiment

The present embodiment is a modification of a preceding embodiment serving as a basic configuration, and may incorporate description of the preceding embodiment(s). In the preceding embodiment, the learning data is a fixed value. Instead of the above, the learning data may be a variable value.

Figure 19:
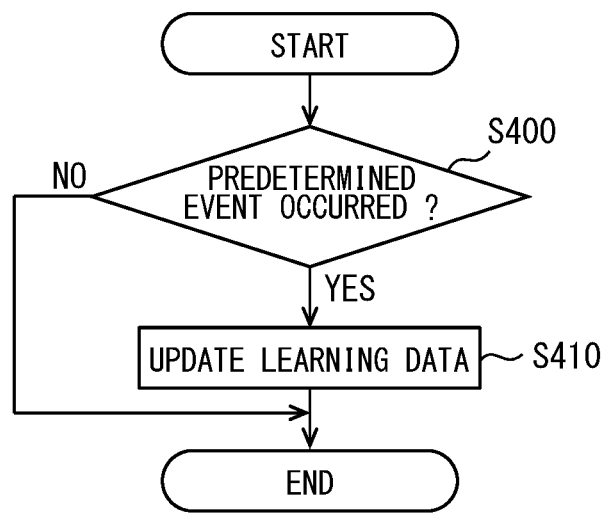
FIG. 19 is a flowchart showing an example of an update process performed by the control device in the battery management system according to a sixth embodiment.

FIG. 19 shows an update process performed by the control device 40 in the battery management system 60 according to the present embodiment. The control device 40 performs the update process in a predetermined cycle.

As shown in FIG. 19, the control device 40 determines whether or not a predetermined event has occurred (step S400). The predetermined event may occur at a switching timing of a start signal such as an IG signal. The predetermined event may occur, for example, when the start-up signal is switched from on to off, or may occur when the start-up signal is switched from off to on. The predetermined event may occur, for example, for every predetermined travel distance. The predetermined event may occur, for example, every time the number of times the monitoring data is received reaches a predetermined number.

When it is determined in step S400 that a predetermined event has occurred, the control device 40 updates the learning data based on the accumulated communication record(s) (step S410). The control device 40 may update the learning data by fusing the initial learning data and the communication record(s) according to a preset rule. The control device 40 determines, for example, a frequency channel in which the communication quality is likely to deteriorate and a frequency channel in which the communication quality is unlikely to deteriorate according to the ratio of communication quality deterioration in the communication records, and uses them as new learning data. Then, the control device 40 may update the learning data by replacing the initial learning data with the new learning data.

Summary of Fifth Embodiment

According to the present embodiment, the control device 40, which is a master device, updates the learning data using the accumulated communication record(s) upon having/observing a predetermined event. According to the above, the unusable channel is determinable according to the actual usage environment, and the target frequency channel is thus/ultimately determined. For example, when the influence of variable factors such as temperature, vibration and the like is large, highly reliable wireless communication is performable.

The configuration described in the present embodiment is combinable with any of the first to fifth embodiments.

Other Embodiments

The disclosure in the specification and drawings is not limited to the exemplified embodiments. The disclosure encompasses the illustrated embodiments and modifications thereof by those skilled in the art. For example, the disclosure is not limited to the parts and/or combinations of elements shown in the embodiments. The disclosure may be implemented in various combinations. The disclosure can have additional portions that can be added to the embodiment. The disclosure includes those in which the parts and/or elements of the embodiment are omitted. The disclosure includes the reallocation or combination of parts and/or elements between one embodiment and another. The disclosed technical scope is not limited to the description of the embodiments. It should be understood that some of the disclosed technical scopes are indicated by description of claims, and includes every modification within the equivalent meaning and the scope of description of claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

When an element or a layer is described as "disposed above" or "connected", the element or the layer may be directly disposed above or connected to another element or another layer, or an intervening element or an intervening layer may be present therebetween. In contrast, when an element or a layer is described as "disposed directly above" or "directly connected", an intervening element or an intervening layer is not present. Other terms used to describe the relationships between elements (for example, "between" vs. "directly between", and "adjacent" vs. "directly adjacent") should be interpreted similarly. As used herein, the term "and/or" includes any combination and all combinations relating to one or more of the related listed items. For example, the term A and/or B includes only A, only B, or both A and B.

Spatial relative terms "inside", "outside", "back", "bottom", "low", "top", "high", etc. are used herein to facilitate the description that describes relationships between one element or feature and another element or feature. Spatial relative terms can be intended to include different orientations of a device in use or operation, in addition to the orientations depicted in the drawings. For example, when the device in the figure is flipped over, an element described as "below" or "directly below" another element or feature is directed "above" the other element or feature. Therefore, the term "below" can include both above and below. The device may be oriented in the other direction (e.g., rotated 90 degrees or in any other direction) and the spatially relative terms used herein are interpreted accordingly.

Examples have been shown in which a microcomputer or IC provides means and/or functions, but the present disclosure is not limited thereto. Each means and/or function may be realized by a dedicated computer including a processor that executes a computer program. Further, the same may be realized by using a dedicated hardware logic circuit. Further, the same may be realized by one or more dedicated computers configured by a combination of (i) a processor that executes a computer program and (ii) one or more hardware logic circuits. The computer program may be stored on a computer-readable, non-transitory, tangible recording medium as an instruction executed by the computer. Means and/or functions can be provided by software recorded in a substantive memory device and the computer executing thereof, software only, hardware only, or a combination thereof. For example, some or all of the functions provided by the processor may be realized as hardware. A mode in which a certain function is realized as hardware includes a mode in which one or more ICs are used. The processor may be realized by using MPU, GPU, DFP instead of CPU. The processor may be realized by combining a plurality of types of arithmetic processing units such as a CPU, an MPU, and a GPU. The processor may be implemented as a system on chip (SoC). Further, various processing units may be realized by using FPGA or ASIC. The various programs may be stored in a non-transitory, substantive recording medium. DFP, which can adopt various storage media such as HDD, SSD, flash memory, and SD card as the storage medium of the program, is an abbreviation for Data Flow Processor. SoC is an abbreviation for System on Chip. FPGA is an abbreviation for Field Programmable Gate Array. ASIC is an abbreviation for Application Specific Integrated Circuit. HDD is an abbreviation for Hard Disk Drive. SSD is an abbreviation for Solid State Disk/Drive. SD is an abbreviation for Secure Digital.

Figure 20:
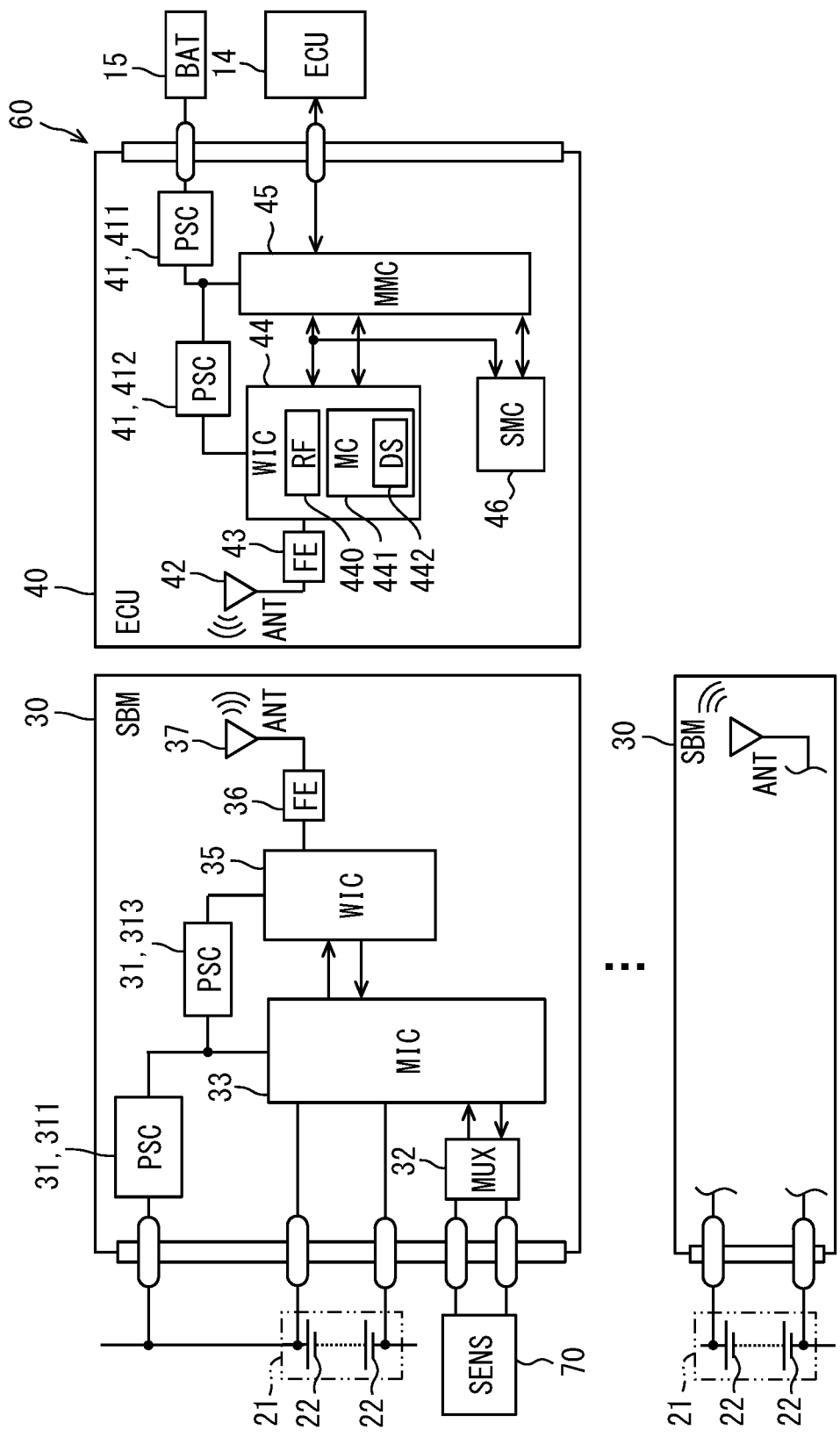
FIG. 20 is a block diagram showing another example of the configuration of the battery management system.

For example, though an example in which the monitoring device 30 includes the microcomputer 34 has been shown, the present disclosure is not limited to such example. As shown in FIG. 20, a battery management system 60 having a configuration in which the monitoring device 30 does not include the microcomputer 34 may be adopted. FIG. 20 corresponds to FIG. 4. In such configuration, the wireless IC 35 transmits/receives data to/from the monitoring IC 33. The wireless IC 35 may perform the sensing by the monitoring IC 33 and the schedule control of the self-diagnosis of the monitoring IC 33, or the main microcomputer 45 of the control device 40 may perform the same.

The arrangement and number of the battery stacks 21 and the battery cells 22 constituting the assembled battery 20 are not limited to the above examples. In the battery pack 11, the arrangement of the monitoring device 30 and/or the control device 40 is not limited to the above example.

An example is shown in which the battery pack 11 includes one control device 40, but the present disclosure is not limited to such example. A plurality of control devices 40 may be provided. The battery pack 11 may include one or more monitoring devices 30 and one or more control devices 40. The battery management system 60 may include a plurality of sets of wireless communication systems constructed between the control device 40 and one or more monitoring devices 30.

An example is shown in which the monitoring device 30 includes one monitoring IC 33, but the present disclosure is not limited to such example. A plurality of monitoring ICs 33 may be provided. In such case, a wireless IC 35 may be provided for each monitoring IC 33, or one wireless IC 35 may be provided for a plurality of monitoring ICs 33.

An example in which the monitoring device 30 is arranged for each battery stack 21 has been shown, but the present disclosure is not limited to such example. For example, one monitoring device 30 may be arranged/provided for a plurality of battery stacks 21. A plurality of monitoring devices 30 may be arranged/provided for one battery stack 21.

An example is shown in which the wireless IC 44 includes the microcomputer 441, but the present disclosure is not limited to such example. The configuration may have the microcomputer 441 dispensed therefrom. The main microcomputer 45 may provide a part of the functions of the wireless IC 44 described above. For example, the wireless IC 35 may be configured not to include a microcomputer/microcontroller. The microcomputer 34 may provide a part of the functions of the wireless IC 35 described above.

An example is shown in which the wireless IC 44 of the control device 40 performs the above-mentioned target frequency channel determination process and the like, but the present disclosure is not limited to such example. The element of the control device 40 may perform the same. For example, the main microcomputer 45 may perform a part of the above-mentioned processes.

An example in which the control device 40 is a master device and the monitoring device 30 is a slave device has been shown, but the present disclosure is not limited to such example. Each of the above-described embodiments may also be applicable to a configuration in which one of the control device 40 and the monitoring device 30 serves a master device and the other serves a slave device to perform wireless communication using frequency channel hopping. For example, the monitoring device 30 may serve as a master device and the control device 40 may serve as a slave device. In such case, the monitoring device 30 stores the learning data in advance. A master device stores in advance data that correlates with the electric field intensity in the housing for each of the usable frequency channels that are usable for transmitting and receiving data to and from each of slave devices that perform wireless communication, as the learning data. A master device determines a target frequency channel or channels for use in frequency channel hopping based on the learning data.

What is claimed is:

1. A battery management system comprising:
    monitoring devices arranged in a housing accommodating respective batteries and respectively monitoring battery information indicating a respective state of the respective battery; and
    a control device acquiring the battery information from the monitoring devices, and performing a predetermined process, wherein
    the control device and the monitoring devices perform wireless communication using frequency channel hopping with the control device serving as a master device and the monitoring devices serving as slave devices, and
    the master device
        stores learning data that correlates with an electric field intensity in the housing for frequency channels that are usable for transmitting and receiving data to and from each of the slave devices for wireless communication,
        determines a target frequency channel of the frequency channel hopping based on the learning data,
        determines a predetermined frequency channel by performing the frequency channel hopping, and
        based on a result of transmitting and receiving data to and from the slave device on the predetermined frequency channel, evaluates and accumulates communication quality as a communication record.

2. The battery management system of claim 1, wherein the master device
- when a value that correlates with deterioration of communication quality in the communication record of the predetermined frequency channel has exceeded a threshold value, determines the target frequency channel by determining the predetermined frequency channel as an unusable channel and by excluding the predetermined from channel from the target frequency channel, and
- sets the threshold value individually for the frequency channels that are usable for communicating with the slave device based on the learning data.

3. The battery management system of claim 2, wherein the master device sets the threshold value according to the electric field intensity, for each of the frequency channels that is usable for transmission and reception of data to and from the slave device.

4. The battery management system of claim 2, wherein the master device
- resets, when the unusable channel satisfies a return condition, the communication record at least for the unusable channel to return the unusable channel to the target frequency channels, and
- sets the return condition individually for the usable frequency channels based on the learning data.

5. The battery management system of claim 1, wherein the master device determines the target frequency channel
- based on the learning data in a period between (i) a time when the master device is started and (ii) a time when data communication is started with the slave device during a period from a start-up to a start of data exchange with the slave device.

6. The battery management system of claim 1, wherein the master device
- determines a predetermined frequency channel for use in communication by performing the frequency channel hopping,
- based on a result of communicating data to and from the slave device on the predetermined frequency channel, evaluates and accumulates communication quality as a communication record, and
- updates the learning data by using the accumulated communication records for each of predetermined events.

7. The battery management system of claim 1, wherein an antenna of the control device is arranged in the housing.

8. The battery management system of claim 1, wherein the control device is arranged in the housing.

* * * * *